(12) United States Patent
Lee et al.

(10) Patent No.: US 10,513,184 B2
(45) Date of Patent: Dec. 24, 2019

(54) INTERFACE SYSTEM FOR VEHICLE

(71) Applicant: LG Elelctronics Inc., Seoul (KR)

(72) Inventors: Gu Lee, Seoul (KR); Uniyoung Kim, Seoul (KR); Daihyung Ryu, Seoul (KR); Dohyeon Kim, Seoul (KR); Sungjun Park, Seoul (KR); Jieun Song, Seoul (KR); Jaeyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 15/856,544

(22) Filed: Dec. 28, 2017

(65) Prior Publication Data

US 2018/0370365 A1 Dec. 27, 2018

(30) Foreign Application Priority Data

Jun. 26, 2017 (KR) .................. 10-2017-0080676

(51) Int. Cl.
*G01C 21/20* (2006.01)
*B60K 35/00* (2006.01)
(Continued)

(52) U.S. Cl.
CPC .............. *B60K 37/06* (2013.01); *B60K 35/00* (2013.01); *B60K 37/02* (2013.01); *G06F 3/0227* (2013.01);
(Continued)

(58) Field of Classification Search
CPC .............. G01C 21/3611; B60W 10/18; B60K 35/00–06; G05D 1/0044–0088
See application file for complete search history.

(56) References Cited

U.S. PATENT DOCUMENTS 5,781,872 A * 7/1998 Konishi ................. B60K 35/00
340/438
6,256,558 B1 * 7/2001 Sugiura .................. B60K 37/06
701/1
(Continued)

FOREIGN PATENT DOCUMENTS

| EP | 1629604 | 3/2006 | |
| EP | 3333003 | 6/2018 | |
| JP | 2016018238 A * | 2/2016 | ............... G05D 1/00 |

OTHER PUBLICATIONS

European Search Report in European Application No. 18179644.2, dated Oct. 10, 2018, 8 pages.

*Primary Examiner* — Lin Li
(74) *Attorney, Agent, or Firm* — Fish & Richardson P.C.

(57) ABSTRACT

A user interface system for a vehicle includes: at least one display unit provided in the vehicle; a detachable interface apparatus configured to be detachably attached to any one of the at least one display unit provided in the vehicle; at least one processor; and a computer-readable medium having stored thereon instructions that, when executed by the at least one processor, cause the at least one processor to perform operations that include: in a state in which the detachable interface apparatus is attached to a selected display unit among the at least one display unit of the vehicle, determining a first user menu corresponding to the selected display unit; and displaying, on the selected display unit or on the detachable interface apparatus, the first user menu corresponding to the selected display unit.

19 Claims, 21 Drawing Sheets

(51) Int. Cl.

| | |
|---|---|
| *G05D 1/00* | (2006.01) |
| *B60K 37/06* | (2006.01) |
| *H04M 1/60* | (2006.01) |
| *G01C 21/36* | (2006.01) |
| *A61B 5/024* | (2006.01) |
| *B60R 11/02* | (2006.01) |
| *G06F 17/50* | (2006.01) |
| *G06F 21/62* | (2013.01) |
| *B60R 16/037* | (2006.01) |
| *G06Q 10/08* | (2012.01) |
| *B60K 37/02* | (2006.01) |
| *G06F 3/02* | (2006.01) |
| *G06F 3/0482* | (2013.01) |
| *G06F 3/0487* | (2013.01) |
| *G06K 9/00* | (2006.01) |
| *H01F 7/06* | (2006.01) |

(52) U.S. Cl.
CPC .......... *G06F 3/0482* (2013.01); *G06F 3/0487* (2013.01); *G06K 9/00845* (2013.01); *B60K 2370/11* (2019.05); *B60K 2370/122* (2019.05); *B60K 2370/126* (2019.05); *B60K 2370/145* (2019.05); *B60K 2370/1537* (2019.05); *B60K 2370/195* (2019.05); *B60K 2370/46* (2019.05); *B60K 2370/55* (2019.05); *B60K 2370/736* (2019.05); *B60K 2370/739* (2019.05); *B60K 2370/81* (2019.05); *B60K 2370/828* (2019.05); *H01F 7/06* (2013.01)

(56) References Cited

U.S. PATENT DOCUMENTS

| | | | |
|---|---|---|---|
| 6,653,948 B1* | 11/2003 | Kunimatsu | G01C 21/3647 340/995.16 |
| 9,477,329 B1 | 10/2016 | Ding | |
| 2002/0032048 A1* | 3/2002 | Kitao | H04M 1/6091 455/569.2 |
| 2004/0254715 A1* | 12/2004 | Yamada | G01C 21/26 701/117 |
| 2005/0278111 A1* | 12/2005 | Ujino | G01C 21/20 701/440 |
| 2008/0024451 A1* | 1/2008 | Aimi | G01C 21/3611 345/168 |
| 2008/0211779 A1* | 9/2008 | Pryor | G01C 21/3664 345/173 |
| 2009/0231145 A1* | 9/2009 | Wada | A61B 5/02416 340/575 |
| 2010/0020042 A1 | 1/2010 | Stelandre et al. | |
| 2013/0039725 A1* | 2/2013 | Clausen | B65G 47/846 414/222.01 |
| 2015/0248131 A1* | 9/2015 | Fairfield | G05D 1/0044 701/2 |
| 2016/0167653 A1* | 6/2016 | Malone | B60W 10/18 701/23 |
| 2016/0210590 A1* | 7/2016 | Sugioka | G06Q 10/08355 |
| 2016/0314224 A1* | 10/2016 | Wei | G06F 17/5009 |
| 2017/0322760 A1* | 11/2017 | Soh | B60R 11/0235 |
| 2018/0113460 A1* | 4/2018 | Koda | G05D 1/0088 |
| 2018/0196501 A1* | 7/2018 | Trotta | B60R 16/037 |
| 2018/0247067 A1* | 8/2018 | Hrabak | G06F 21/6218 |

\* cited by examiner

Fig. 1
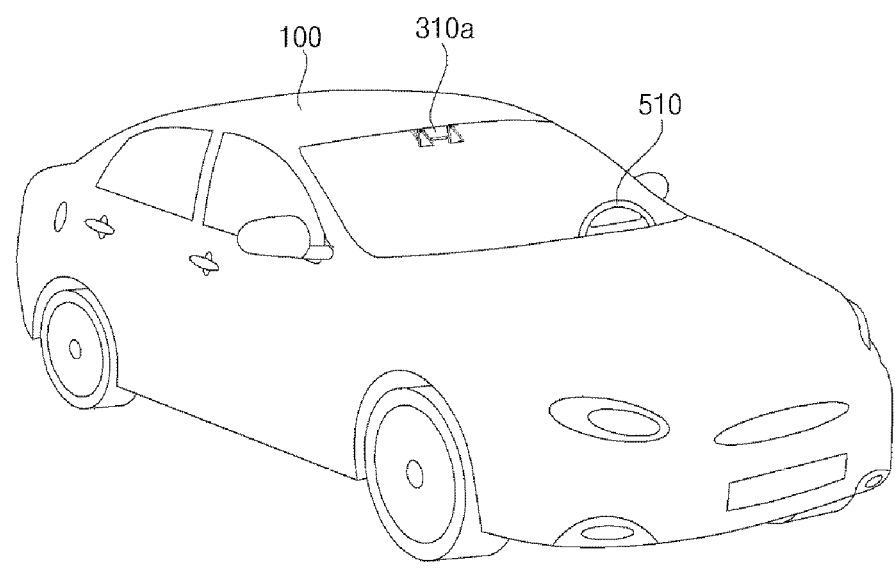
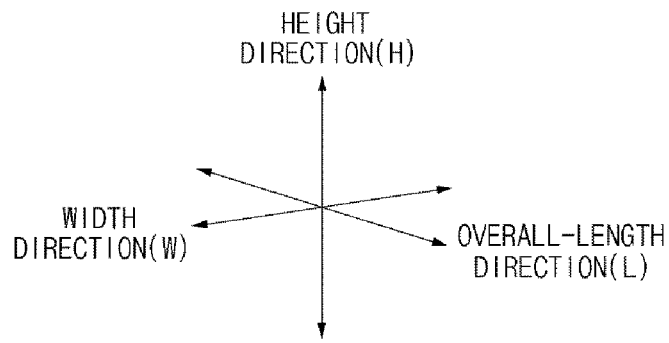

Fig. 13
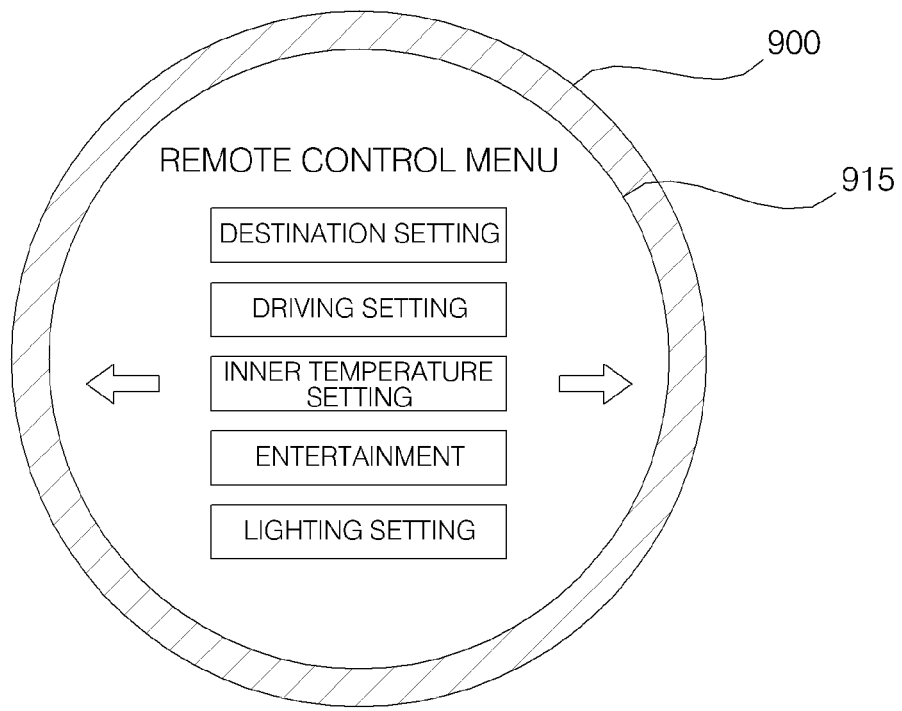
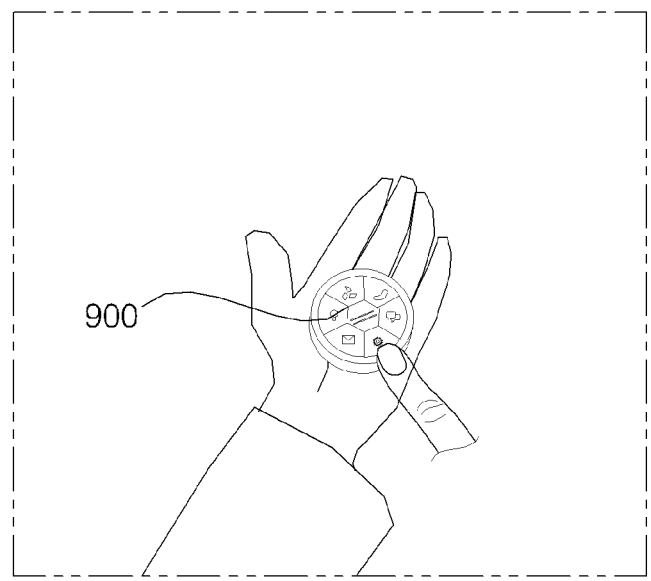

Fig. 15
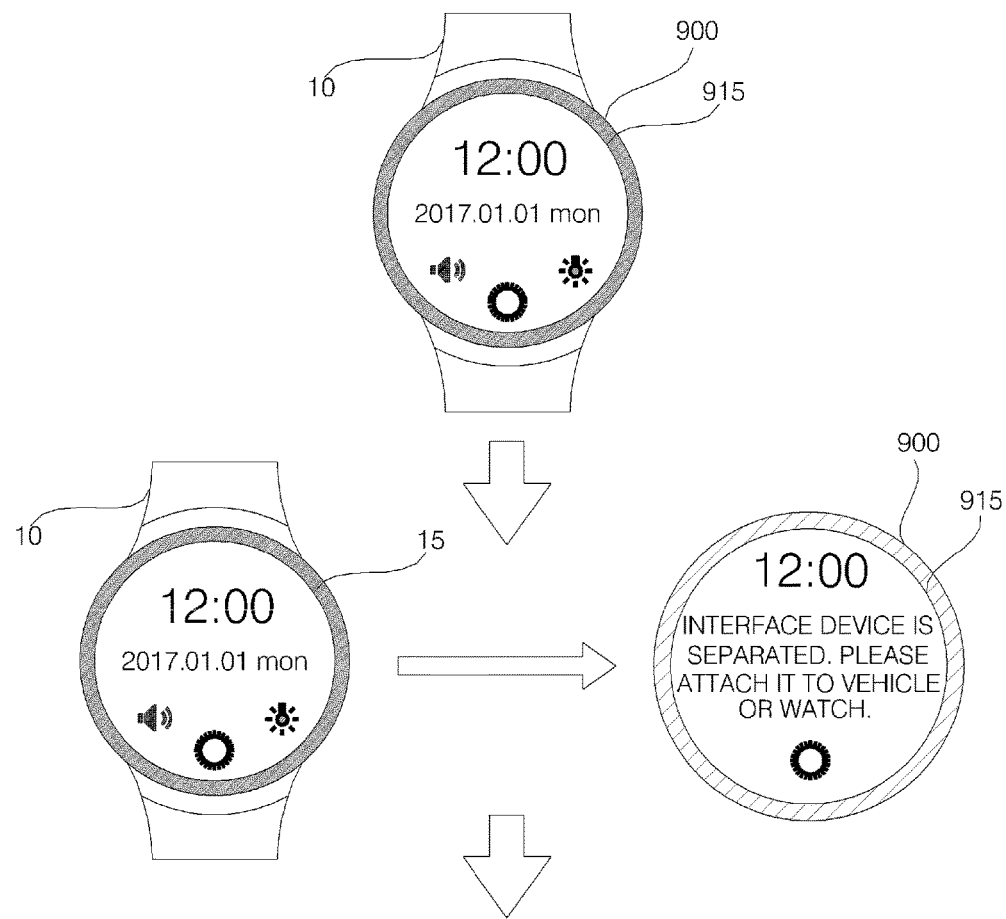
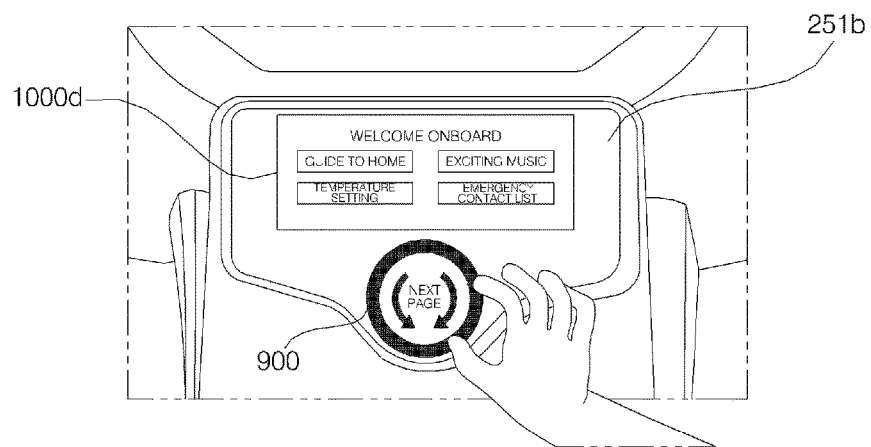

Fig. 17
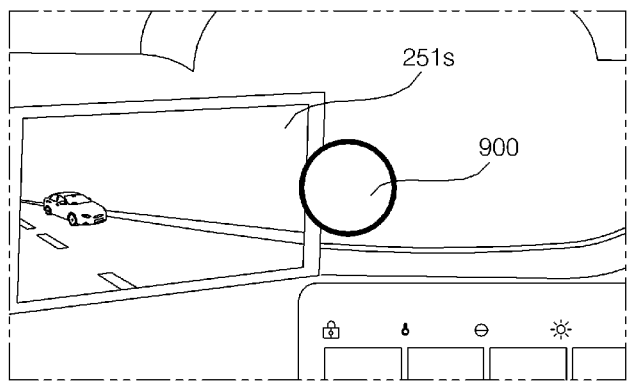
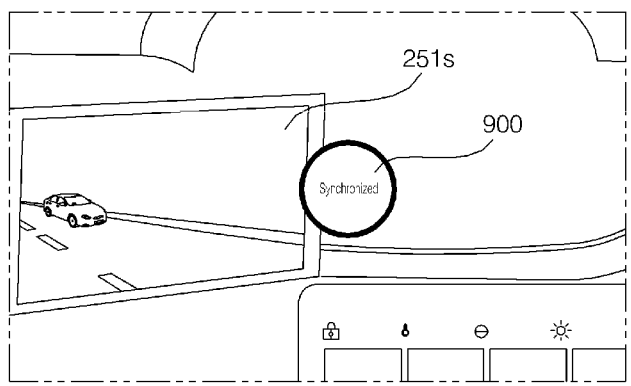
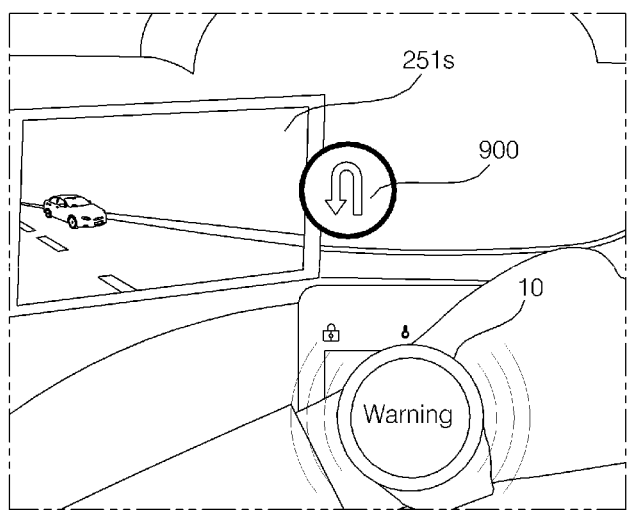

INTERFACE SYSTEM FOR VEHICLE

CROSS-REFERENCE TO RELATED APPLICATION

This application claims the benefit of an earlier filing date and right of priority to Korean Patent Application No. 10-2017-0080676, filed on Jun. 26, 2017 in the Korean Intellectual Property Office, the disclosure of which is incorporated herein by reference.

TECHNICAL FIELD

The present disclosure relates to an interface system for a vehicle.

BACKGROUND

A vehicle is an apparatus that moves in a direction desired by a user riding therein. An example of a vehicle is an automobile.

A vehicle is typically equipped with various sensors and electronic devices designed to improve a user's convenience. In particular, an Advanced Driver Assistance System (ADAS) has been studied and researched to improve convenience for a driver. Furthermore, efforts have been made to develop and study vehicle driving systems that enable a vehicle to travel autonomously.

SUMMARY

Implementations disclosed herein provide a detachable interface apparatus that is configured to be attached to and detached from at least one display unit of a vehicle, and to interoperate with the display unit to provide a user with various types of functionality in the vehicle.

In one aspect, a user interface system for a vehicle includes: at least one display unit provided in the vehicle; a detachable interface apparatus configured to be detachably attached to any one of the at least one display unit provided in the vehicle; at least one processor; and a computer-readable medium having stored thereon instructions that, when executed by the at least one processor, cause the at least one processor to perform operations including: in a state in which the detachable interface apparatus is attached to a selected display unit among the at least one display unit of the vehicle, determining a first user menu corresponding to the selected display unit; and displaying, on the selected display unit or on the detachable interface apparatus, the first user menu corresponding to the selected display unit.

In some implementations, the at least one display unit of the vehicle, the at least one processor, and the computer-readable medium are implemented as part of a user interface apparatus provided in the vehicle. The user interface apparatus of the vehicle is configured to be communicative with the detachable interface apparatus.

In some implementations, the operations executed by the at least one processor further include: based on a determination that the selected display unit is an instrument panel of the vehicle, display the first user menu as a driver menu on the selected instrument panel or on the detachable interface apparatus; and based on a determination that the selected display unit is a Center Information Display (CID) or a Rear Seat Entertainment (RSE) of the vehicle, display the first menu as a passenger menu on the selected CID or on the selected RSE or on the detachable interface apparatus.

In some implementations, the vehicle further includes a communication apparatus. The detachable interface apparatus, which is configured to be detachably attached to the at least one display unit of the vehicle, further includes: an input module configured to receive a user input; a display module; and a communication module configured to communicate with the communication apparatus of the vehicle. The operations that are executed by the at least one processor further include: acquiring, through the communication apparatus of the vehicle and from the communication module of the detachable interface apparatus, a first user input for controlling the vehicle; based on the first user input, determining a graphic object to be displayed on the display module of the detachable interface apparatus, wherein the graphic object is configured to allow the user to manipulate the first user menu that is displayed on the selected display unit or on the detachable interface apparatus; and providing, from the communication apparatus of the vehicle and to the communication module of the detachable interface apparatus, a first control signal configured to cause the display module of the detachable interface apparatus to display the graphic object.

In some implementations, the operations executed by the at least one processor further include: in a state in which the detachable interface apparatus is not attached to any of the at least one display unit of the vehicle: determining a remote control menu for controlling one or more devices included in the vehicle; and providing, from the communication apparatus of the vehicle and to the communication module of the detachable interface apparatus, a second control signal configured to cause the remote control menu to be displayed on the display module of the detachable interface apparatus.

In some implementations, the vehicle further includes an interface unit configured to receive information. The operations executed by the at least one processor further include: in a state in which the detachable interface apparatus is not attached to any of the at least one display unit of the vehicle: determining whether the vehicle is in an autonomous mode or a manual mode, based on vehicle state information acquired through the interface unit; based on a determination that the vehicle is in the autonomous mode, outputting the remote control menu to the detachable interface apparatus; and based on a determination that the vehicle is in the manual mode, deactivating the detachable interface apparatus.

In some implementations, the vehicle further includes a camera. The operations executed by the at least one processor further include: in the state in which the detachable interface apparatus is not attached to any of the at least one display unit of the vehicle, and based on the determination that the vehicle is in the manual mode: based on a determination, through an image of an inside of the vehicle acquired through the camera, that a driver of the vehicle is manipulating the detachable interface apparatus, deactivating the detachable interface apparatus; and based on a determination, through the image of the inside of the vehicle acquired through the camera, that a passenger of the vehicle is manipulating the detachable interface apparatus, outputting the remote control menu to the detachable interface apparatus.

In some implementations, the operations executed by the at least one processor further include: in the state in which the detachable interface apparatus is attached to the selected display unit of the vehicle, and based on a determination that the vehicle is in a manual driving mode: increasing an adhesive force by which the detachable interface apparatus is attached to the selected display unit of the vehicle.

In some implementations, the vehicle further includes at least one electromagnet that is disposed at a rear surface of the at least one display unit, and that is configured to have a variable magnetic force. The detachable interface apparatus further includes an electromagnet module that is disposed at a rear surface of the detachable interface apparatus, and that is configured to have a variable magnetic force. Increasing the adhesive force by which the detachable interface apparatus is attached to the selected display unit of the vehicle includes: increasing at least one of a magnetic force of the at least one electromagnet of the at least one display unit, or a magnetic force of the electromagnet module of the detachable interface apparatus.

In some implementations, the user interface system further includes a mobile terminal including the detachable interface apparatus. The detachable interface apparatus is further configured to be detached from the mobile terminal and wirelessly connected to the mobile terminal. The operations executed by the at least one processor further include: in the state in which the detachable interface apparatus is attached to the selected display unit of the vehicle, acquire information from the mobile terminal.

In some implementations, the operations executed by the at least one processor further include: determining, from the information acquired from the mobile terminal, user information related to a user; based on the user information, determining the first user menu corresponding to the selected display unit; and displaying the first user menu on the selected display unit.

In some implementations, the operations executed by the at least one processor further include: based on a determination that the user information related to the user indicates that the user is a driver of the vehicle, displaying the first menu as a driver menu on the selected display unit; and based on a determination that the user information related to the user indicates that the user is a passenger of the vehicle, displaying the first menu as a passenger menu on the selected display unit.

In some implementations, the operations executed by the at least one processor further include: controlling one or more devices provided in the vehicle based on the information acquired from the mobile terminal.

In some implementations, the operations executed by the at least one processor further include: controlling a first device, among the one or more devices provided in the vehicle, that corresponds to a type of the selected display unit.

In some implementations, the operations executed by the at least one processor further include: determining, from the information acquired from the mobile terminal, application information regarding an application that is executed by the mobile terminal; and based on the application information, outputting, to an output unit of the vehicle, at least one of a screen or a sound of the application that is executed in the mobile terminal.

In some implementations, the vehicle further includes an interface unit configured to receive information. The operations executed by the at least one processor further include: reducing the output of the at least one of the screen or the sound of the application based on a determination, through vehicle state information acquired through the interface unit, that the vehicle is in a manual mode.

In some implementations, the vehicle further includes an interface unit configured to receive information. The operations executed by the at least one processor further include: based on a determination that the information acquired through the interface unit satisfies one or more criteria, providing a first signal to the mobile terminal to output an alarm that corresponds to the information satisfying the one or more criteria. The mobile terminal is configured to output the alarm based on the first signal.

In some implementations, the operations executed by the at least one processor further include: determining whether the information acquired through the interface satisfies the one or more criteria, based on a type of the selected display unit; and determining an alarm output operation for outputting the alarm, based on a type of the mobile terminal that will output the alarm, the type of the mobile terminal being determined based on the information acquired through the interface unit.

In some implementations, the user interface system further includes a mobile terminal. The vehicle and the mobile terminal are configured to be wirelessly connected to each other in a state in which the detachable interface apparatus is wirelessly connected to the mobile terminal.

In some implementations, the operations executed by the at least one processor further include: in a state in which the vehicle and the mobile terminal are wirelessly connected to each other, providing a control signal to the mobile terminal for outputting a remote control menu, wherein the remote control menu is configured to allow a user to control one or more devices provided in the vehicle.

In some implementations, the mobile terminal is one among a plurality of mobile terminals, and the detachable interface apparatus is configured to be wirelessly connected to a first mobile terminal, among the plurality of mobile terminals that are located within a first distance of the vehicle. The operations executed by the at least one processor further include: in a state in which the vehicle is wirelessly connected to the plurality of mobile terminals, receiving a plurality of user inputs respectively from the plurality of mobile terminals; and determining that a first user input received from the first mobile terminal that is connected to the detachable interface apparatus is a first-prioritized input among the plurality of user inputs.

In another aspect, a user interface apparatus provided in a vehicle includes: at least one display unit; at least one processor; and a computer-readable medium having stored thereon instructions that, when executed by the at least one processor, cause the at least one processor to perform operations including: in a state in which a detachable interface apparatus is attached to a selected display unit among the at least one display unit of the vehicle, determining a first user menu corresponding to the selected display unit; and providing a control signal configured to cause the selected display unit or the detachable interface apparatus to display the first user menu corresponding to the selected display unit.

In another aspect, a detachable interface apparatus is configured to be detachably attached to any one of at least one display unit provided in a vehicle. The detachable interface apparatus includes: a display module; at least one processor; and a computer-readable medium having stored thereon instructions that, when executed by the at least one processor, cause the at least one processor to perform operations including: in a state in which the detachable interface apparatus is attached to a selected display unit among the at least one display unit of the vehicle, determining a first user menu corresponding to the selected display unit; and displaying, on the display module of the detachable interface apparatus, the first user menu corresponding to the selected display unit.

In some implementations, the detachable interface apparatus further includes: an input module configured to receive a user input; and a communication module configured to communicate with a communication apparatus of the vehicle. The operations executed by the at least one processor of the detachable interface apparatus further include: transmitting, through the communication module and to the communication apparatus of the vehicle, a first user input for controlling the vehicle; and receiving, through the communication module and from the communication apparatus of the vehicle, a first control signal configured to cause the display module of the detachable interface apparatus to display a graphic object configured to allow the user to manipulate the first user menu.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 1 is a diagram illustrating an example of an external appearance of a vehicle according to an implementation;

FIG. 13 is a diagram illustrating an example of a remote control menu which is output to a detachable interface apparatus according to an implementation;

FIG. 15 is a diagram illustrating an example in which a detachable interface apparatus provided in a mobile terminal becomes attached to a display unit of a vehicle, according to an implementation;

FIG. 17 is a diagram illustrating an example in which a user interface apparatus outputs, through a mobile terminal, an alarm corresponding to information that satisfies particular criteria.

DETAILED DESCRIPTION

Figure 2:
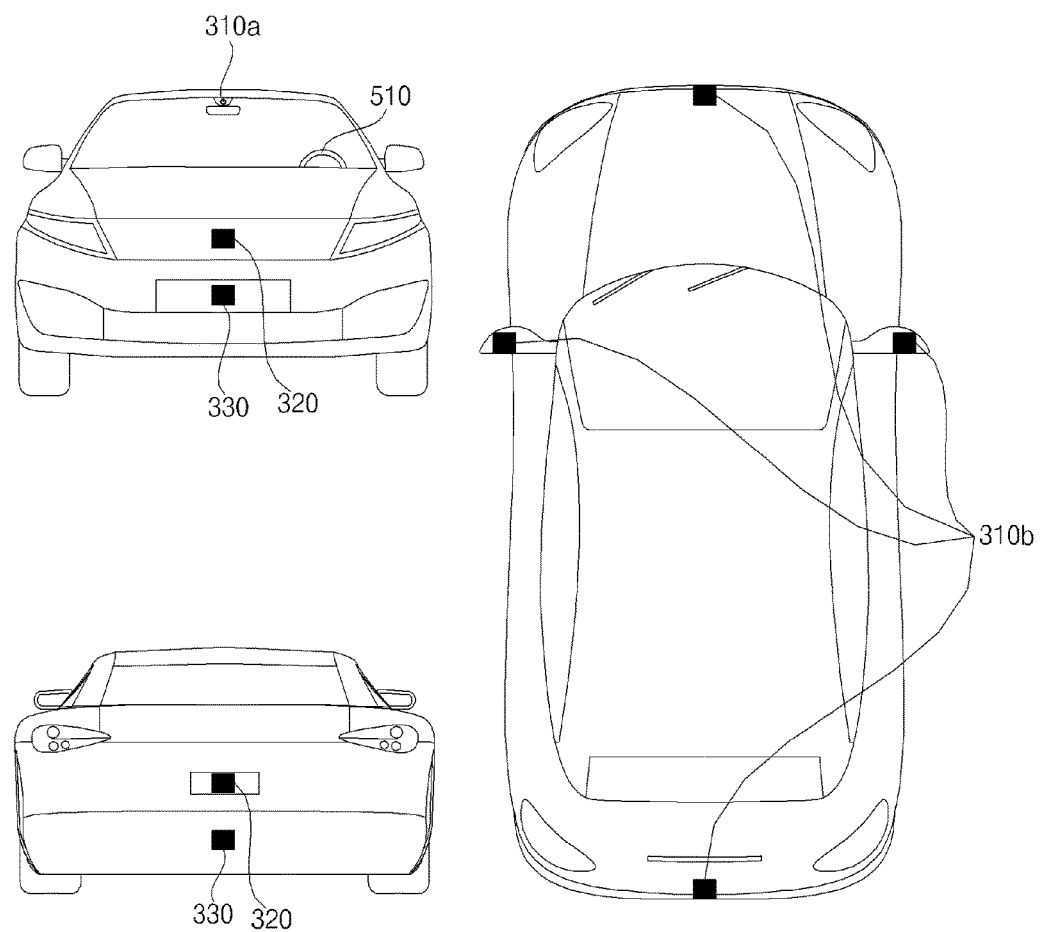
FIG. 2 is a diagram illustrating an example of different angled views of the external appearance of a vehicle according to an implementation.

A vehicle may have various input devices configured to receive a user input. In some implementations, an input device may be configured to be attached to and detached from a display surface of a vehicle. For example, the detachable input device may be attached to the display surface using an electromagnet or other suitable attachment technique.

A vehicle may include various types of display surfaces and display devices. Example of display devices provided in a vehicle include an instrument panel, a Center Information Display (CID) on the dashboard, a Rear Seat entertainment (RSE), etc.

In addition, a vehicle may communicate with various types of mobile terminals. Examples of such mobile terminals include a phone, a watch, a pair of glasses, an earphone, a wearable device, a tablet, etc.

In some implementations, a detachable interface apparatus and a mobile terminal may interoperate with display devices of a vehicle to control different operations of the vehicle. The detachable interface apparatus may be configured to be attached directly to a surface of any of the display devices. This may facilitate interoperation of the detachable interface apparatus and display devices of the vehicle.

The overall system that includes at least the detachable interface apparatus, the mobile terminal, and the display devices of the vehicle will be sometimes referred to herein as an interface system for the vehicle.

In some implementations, the interface system may enable remotely controlling one or more operations of the vehicle by interlinking various types of mobile terminals with the interface system.

In some implementations, the detachable interface apparatus may be a removable component of the mobile terminal that can be attached to a display device of the vehicle, or may be an apparatus that is independent of the mobile terminal. In general, the detachable interface apparatus, the mobile terminal, and the display devices of the vehicle may interoperate in various ways to provide a flexible and adaptive interface system for the vehicle.

In some scenarios, implementations of the present disclosure may have one or more effects as follows.

First, the interface system may enable controlling a vehicle in a different way depending in a type of a display device to which a detachable interface apparatus is attached.

Second, the interface apparatus may enable communication between a mobile terminal and a vehicle using a detachable interface apparatus.

Effects of the present disclosure are not limited to the aforementioned effects and other unmentioned effects will be clearly understood by those skilled in the art.

A vehicle as described in this specification may include any suitable motorized vehicle, such as an automobile or a motorcycle. Hereinafter, a description will be given based on an automobile.

A vehicle as described in this specification may be powered by any suitable source of power, and may include, for example, an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIGS. 1 to 7 are diagrams for explanation of a vehicle according to the present disclosure. Hereinafter, the vehicle according to the present disclosure will be described with reference to FIGS. 1 to 7.

FIG. 1 is a view of the external appearance of a vehicle according to an implementation.

FIG. 2 is different angled views of a vehicle according to an implementation.

Figure 3:
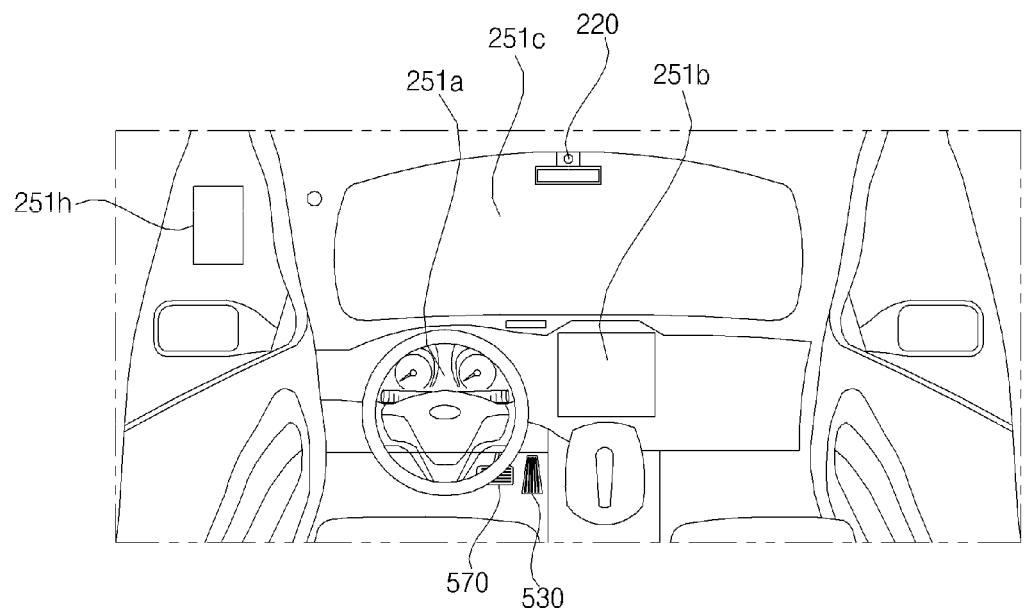
FIGS. 3 and 4 are diagrams illustrating examples of views illustrating the interior configuration of a vehicle according to an implementation.
Figure 4:
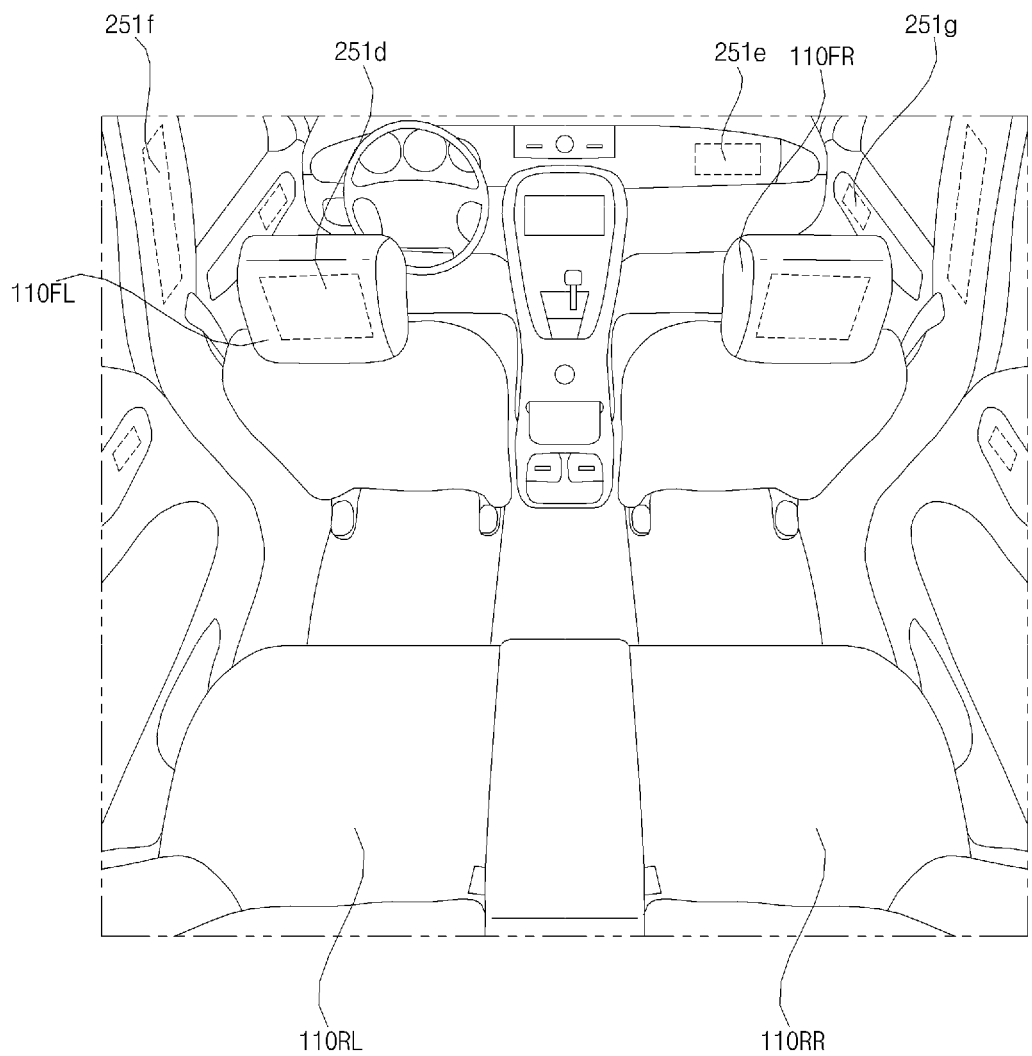

FIGS. 3 and 4 are views of the internal configuration of a vehicle according to an implementation.

Figure 5:
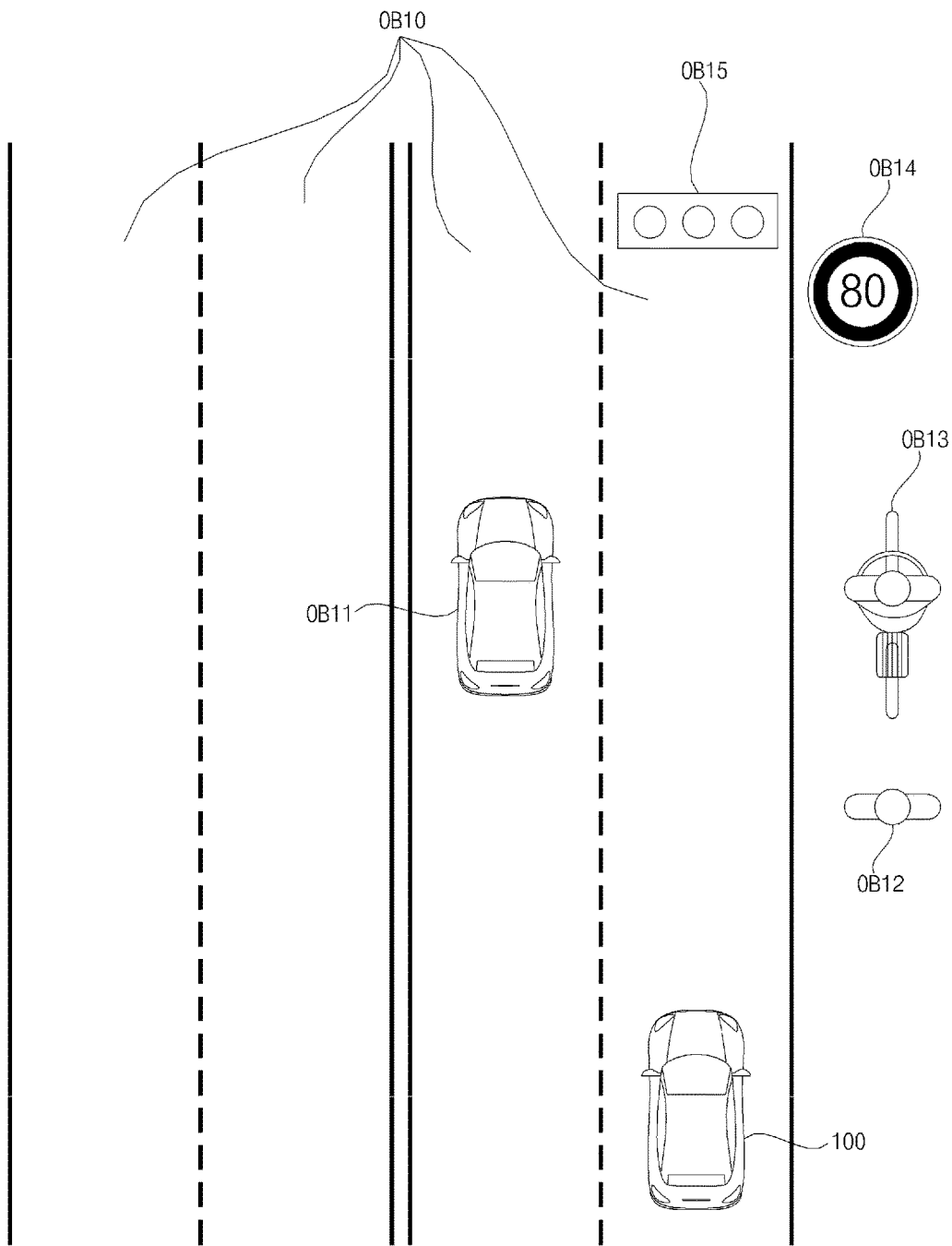
FIGS. 5 and 6 are diagrams illustrating examples of objects detected outside a vehicle according to an implementation.
Figure 6:
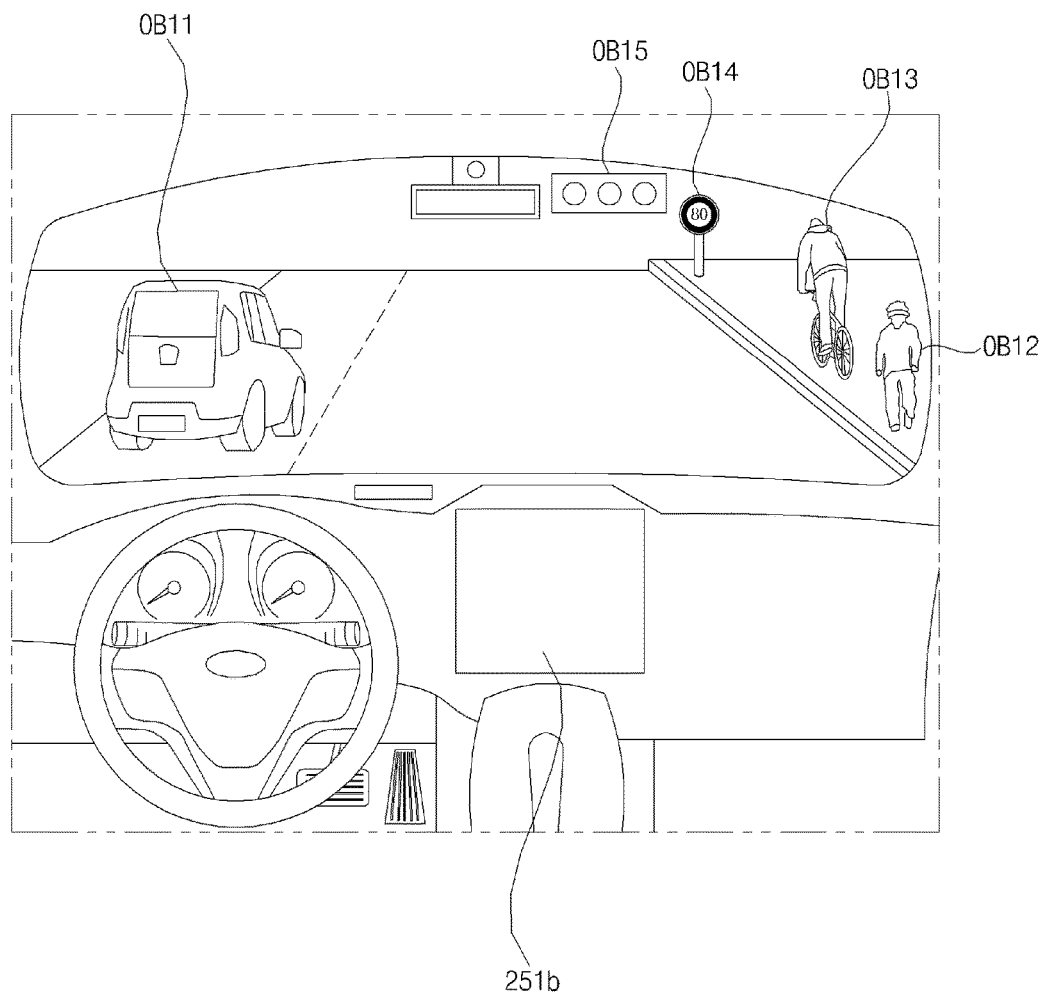

FIGS. 5 and 6 are views for explanation of objects detected by a vehicle according to an implementation.

Figure 7:
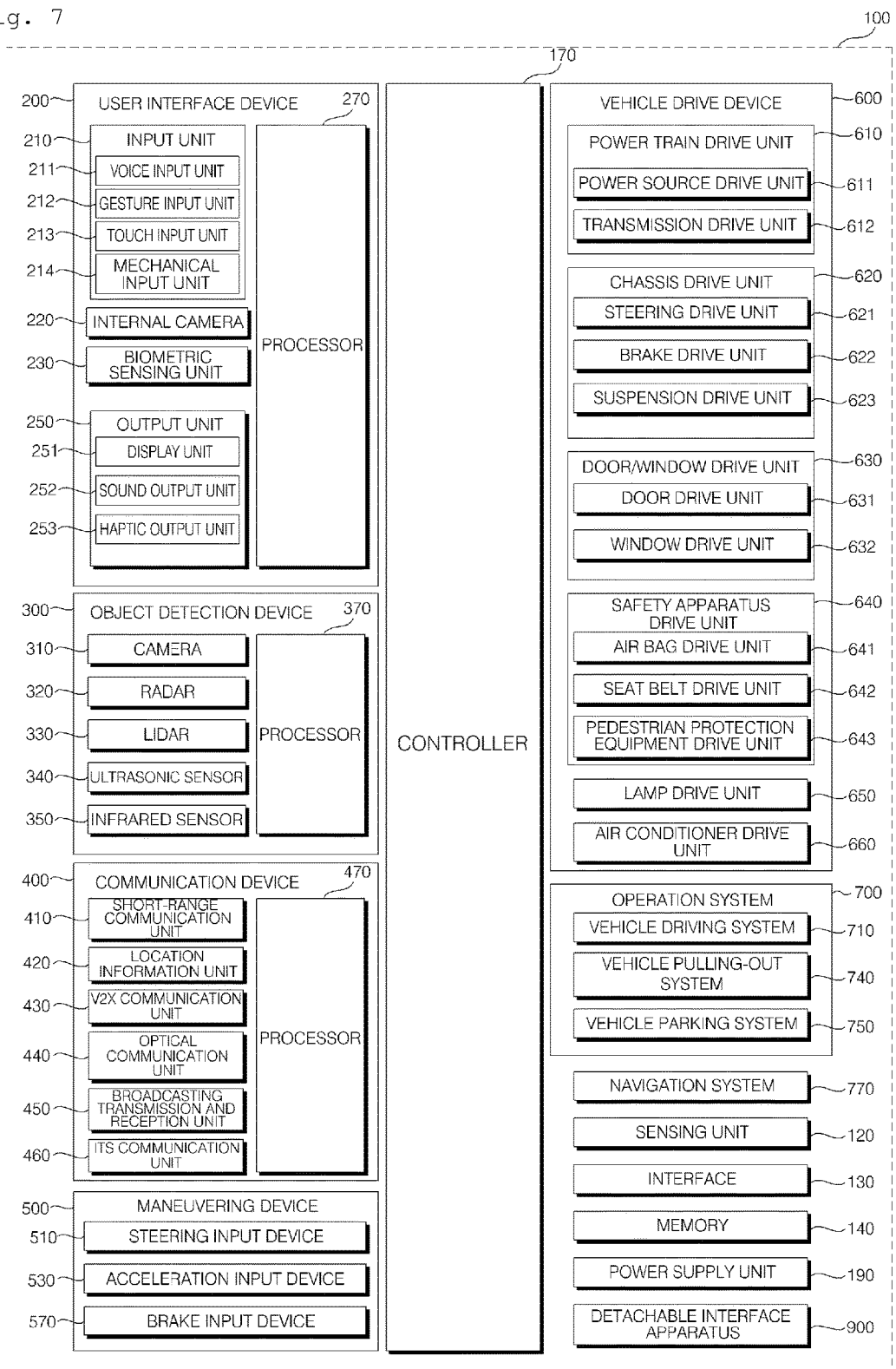
FIG. 7 is a block diagram illustrating an example of a vehicle according to an implementation.

FIG. 7 is a block diagram illustrating a vehicle according to an implementation.

Referring to FIGS. 1 to 7, a vehicle 100 may include a plurality of wheels, which are rotated by a power source, and a steering input device 510 for controlling a driving direction of the vehicle 100.

The vehicle may include various driver assistance apparatuses. A driver assistance apparatus is an apparatus which assists a driver based on information acquired by various sensors. The driver assistance apparatus may be referred to as an Advanced Driver Assistance System (ADAS).

The vehicle 100 may include various lighting devices for vehicle. A lighting device for vehicle may include a head lamp, a brake lamp, a tail lamp, a turn signal lamp, a room lamp, etc. The rear combination lamp includes a brake lamp and a trail lamp.

The vehicle 100 may include a sensing device inside the vehicle 100, and a sensing device outside the vehicle 100.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

In some implementations, the vehicle 100 may be an autonomous vehicle. The vehicle 100 may travel autonomously under the control of one or more processors, such as controller 170. The vehicle 100 may travel autonomously based on the information acquired by the vehicle. Such information will be referred to below as first information.

The first information may be information acquired from various units in the vehicle 100 during travelling of the vehicle 100. The first information may be information which is used to control the vehicle 100 by the controller 170 or a vehicle travel system 700.

The first information may include at least one of the following: object information acquired by an object detection apparatus 300; information received by a communication apparatus 400; a user input received by a user interface apparatus 200 or a driving manipulation apparatus 500; navigation information provided by the navigation system 770; various kinds of sensing information provided by the sensing unit 120; information acquired and provided by the interface unit 130; or information stored in the memory 140.

The first information may be acquired by at least one of the user interface apparatus 200, the object detection apparatus 300, the communication apparatus 400, the driving manipulation apparatus 500, the navigation system 770, the sensing unit 120, the interface unit 130, or the memory 140, and then may be provided to the controller 170 or the vehicle travel system 700. The controller 170 or the vehicle travel system 700 may control autonomous driving of the vehicle 100 based on the first information.

The object information may be information about an object detected by the object detection apparatus 300. For example, the object information may be information about a type, a location, a size, and/or a color of the object. Examples of objects related to the object information may include a lane of a road, an image painted on a road surface, an obstacle, a nearby vehicle, a pedestrian, a traffic light, various structures such as walls or curbs, and/or traffic signs.

Communication information received by the communication apparatus 400 may be information transmitted by an external device which is enabled to perform communication. For example, the communication information may include at least one of: information transmitted by a nearby vehicle; information transmitted by a mobile terminal; information transmitted by traffic infrastructure; or information existing in a specific network. The traffic infrastructure may include a traffic light, and the traffic light may transmit information about a traffic signal.

In addition, the first information may include at least one of: information about a state of any of various devices included in the vehicle 100; or information about a location of the vehicle 100. For example, the first information may include information about an error of any of various devices included in the vehicle 100, information about an operational state of any of various devices included in the vehicle 100, information about a path of travel of the vehicle 100, and/or map information.

For example, based on the first information, the controller 170 or the vehicle travel system 700 may determine a type, a location, and/or movement of an object located in the vicinity of the vehicle 100. Based on the first information, the controller 170 or the vehicle travel system 700 may determine: a probability of collision between the vehicle 100 and an object; a type of a road in which the vehicle 100 is travelling; a state of a traffic light in the vicinity of the vehicle 100; and/or movement of the vehicle 100.

Out of the first information, information about a vehicle surrounding environment or situation may be referred to as surrounding environment information or surrounding situation information.

Occupant information is information about an occupant in the vehicle 100. Out of the first information, the information about an occupant in the vehicle 100 may be referred to as occupant information.

The occupant information may be acquired by internal sensors inside the vehicle, such as an internal camera 220 or a biometric sensing unit 230. For example, the occupant information may include at least one of an image of the occupant in the vehicle 100 and biometric information of the occupant.

As a particular example, the occupant information may be an image of the occupant acquired by the internal camera 220. For example, the biometric information may be information about a body temperature, a pulse, and brainwaves of the occupant acquired by the biometric sensing unit 230.

For example, based on the occupant information, the controller 170 may determine a location, a shape, a gaze, a face, a behavior, a facial expression, drowsiness, a health condition, and/or an emotional state of an occupant.

In addition, the occupant information may be information transmitted by a mobile terminal of an occupant and received by the communication apparatus 400. For example, the occupant information may be authentication information used to authenticate an occupant.

The occupant information may be acquired by an occupant detection unit 240 or the communication apparatus 400 and provided to the controller 170. In some implementations, the occupant information may be included in the first information.

The vehicle state information is information about a state of any of various units included in the vehicle 100. Out of the first information, the information about a state of any of the units included in the vehicle 100 may be referred to as vehicle state information.

For example, the vehicle state information may include information about an operational state and an error of any of the user interface apparatus 200, the object detection apparatus 300, the communication apparatus 400, the driving manipulation apparatus 500, the vehicle drive apparatus 600, the vehicle travel system 700, the navigation system 770, the sensing unit 120, the interface unit 130, and the memory 140.

Based on the vehicle state information, the controller 170 may determine an operation or an error of any of various units included in the vehicle 100. For example, based on the vehicle state information, the controller 170 may determine whether a GPS signal from the vehicle 100 is properly received, whether an error has occurred in at least one sensor included in the vehicle 100, or whether each device included in the vehicle 100 operates properly.

In some implementations, the vehicle state information may be included in the first information.

A control mode of the vehicle 100 may be a mode indicating a subject which controls the vehicle 100.

For example, the control mode of the vehicle 100 may include an autonomous mode in which the controller 170 or the vehicle travel system 700 included in the vehicle 100 controls the vehicle 100, a manual mode in which a driver of the vehicle 100 controls the vehicle 100, and a remote control mode in which an external device other than the vehicle 100 controls the vehicle 100.

When the vehicle 100 is in the autonomous mode, the controller 170 or the vehicle travel system 700 may control the vehicle 100 based on the first information. Accordingly, the vehicle 100 may travel without a user's command received through the driving manipulation apparatus 500. For example, when the vehicle is in the autonomous mode, the vehicle 100 may travel based on information, data, or a signal generated by the driving system 710, the parking-out system 740, and the parking system 750.

When the vehicle 100 is in the manual mode, the vehicle 100 may be controlled in accordance with a user's command relating to at least one of steering, acceleration, and deceleration of the vehicle 100 received through the driving manipulation apparatus 500. In this case, the driving manipulation apparatus 500 may generate an input signal corresponding to the user's command and provide the input signal to the controller 170. The controller 170 may control the vehicle 100 based on the input signal provided by the driving manipulation apparatus 500.

When the vehicle 100 is in the remote control mode, a device other than the vehicle 100 may control the vehicle 100. In the remote control mode, the vehicle 100 may receive a remote control signal transmitted by a different device. The vehicle 100 may be controlled based on the remote control signal.

The vehicle 100 may enter one of the autonomous mode, the manual mode, and the remote control mode based on a user input received through the user interface apparatus 200.

The control mode of the vehicle 100 may switch to one of the autonomous mode, the manual mode, and the remote control mode based on the first information. For example, the control mode of the vehicle 100 may switch from the manual mode to the autonomous mode or from the autonomous mode to the manual mode based on object information generated by the object detection apparatus 300. The control mode of the vehicle 100 may switch from the manual mode to the autonomous mode or from the autonomous mode to the manual mode based on information received through the communication apparatus 400.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190. In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor such as interface processor 270.

In some implementations, the user interface apparatus 200 may further include other components in addition to the aforementioned components, or may not include some of the aforementioned components.

The input unit 210 is configured to receive a user input from a user, and data collected in the input unit 210 may be analyzed by the interface processor 270 and then considered to be a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert a gesture input of a user into an electrical signal. The converted electrical signal may be provided to the interface processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the interface processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the interface processor 270 or the controller 170.

The mechanical input unit 214 may be located on a steering wheel, a center fascia, a center console, a cockpit module, a door, etc.

An occupant detection unit 240 may detect an occupant inside the vehicle 100. The occupant detection unit may include an internal camera 220 and a biometric sensing unit 230.

The internal camera 220 may acquire images of the inside of the vehicle 100. The interface processor 270 may sense a user state based on the images of the inside of the vehicle 100. For example, the detected user state may be an eye gaze, a face, a behavior, a facial expression, and a position of a user.

The interface processor 270 may determine an eye gaze, a face, a behavior, a facial expression, and a position of a user based on images of inside of the vehicle 100 acquired by the internal camera 220. The interface processor 270 may determine a user's gesture based on the images of the inside of the vehicle 100. A determination made by the interface processor 270 based on the images of the inside of the vehicle may be referred to as occupant information. In this case, the occupant information may be information indicating a gaze direction, a behavior, a facial expression, and a gesture of the user. The interface processor 270 may provide the occupant information to the controller 170.

The biometric sensing unit 230 may acquire biometric information of the user. The biometric sensing unit 230 may include a sensor for acquire biometric information of the user, and may utilize the sensor to acquire finger print information, pulse information, and brainwave information of a user. The biometric information may be used to authenticate a user or determine a state of the user.

The interface processor 270 may determine a user's state based on the user's biometric information acquired by the biometric sensing unit 230. The user's state determined by the interface processor 270 may be referred to as occupant information. In this case, the occupant information may be information indicating whether the user loses consciousness, is drowsy, excited, or in an emergency situation. The interface processor 270 may provide the occupant information to the controller 170.

The output unit 250 is configured to generate a visual, audio, or tactile output.

The output unit 250 may include at least one of a display unit 251, a sound output unit 252, or a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of a dashboard, a region 251d of a seat, a region 251f of each pillar, a region 251g of a door, a region of a center console, a region of a head lining, a region of a sun visor, a region 251c of a windshield, or a region 251h of a window.

For example, the display unit 251 may include an instrument panel 251a disposed in front of a driver's seat, a Center Information Display (CID) 251b disposed at the center facia, a front-passenger seat display 251e disposed in front of the front-passenger seat, a Rear Seat entertainment (RSE) 251d disposed at one rear surface of each front seat 110FL and 110FR, and a Head Up Display (HUD) 251C disposed at one region of a windshield.

The sound output unit 252 converts an electrical signal from the interface processor 270 or the controller 170 into an audio signal, and outputs the audio signal. To this end, the sound output unit 252 may include one or more speakers.

The haptic output unit 253 generates a tactile output. For example, the tactile output is vibration. The haptic output unit 253 may operate to vibrate a steering wheel, a safety belt, and seats 110FL, 110FR, 110RL, and 110RR so as to allow a user to recognize the output.

The interface processor 270 may control the overall operation of each unit of the user interface apparatus 200.

In some implementations, the user interface apparatus 200 may include a plurality of interface processors 270 or may not include any interface processor 270.

In the case where the user interface apparatus 200 does not include any interface processor 270, the user interface apparatus 200 may operate under control of the controller 170 or a processor of a different device inside the vehicle 100.

In some implementations, the user interface apparatus 200 may be referred to as a multimedia device for vehicle.

The user interface apparatus 200 may operate under control of the controller 170.

The object detection apparatus 300 is configured to detect an object outside the vehicle 100.

The object may include various objects related to travelling of the vehicle 100.

Referring to FIGS. 5 and 6, an object o may include a lane OB10, a line for distinguishing the lane OB10, a nearby vehicle OB11, a pedestrian OB12, a two-wheeled vehicle OB13, a traffic signal OB14 and OB15, a curb for distinguishing a sidewalk, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100. For example, the nearby vehicle OB11 may be a vehicle travelling on the side of the vehicle 100.

The pedestrian OB12 may be a person located in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal OB14 and OB15 may include a traffic light OB15, a traffic sign plate OB14, and a pattern or text painted on a road surface.

The light may be light generated by a lamp provided in the nearby vehicle OB11. The light may be light generated by a street light. The light may be solar light.

The road may include a road surface, a curve, and slopes, such as an upward slope and a downward slope. The geographical feature may include a mountain and a hill.

The structure may be a body located around the road in the state of being fixed onto the ground. For example, the structure may include a streetlight, a roadside tree, a building, a traffic light, a bridge, a curb, and a guardrail.

In some implementations, the object may be classified as a movable object or a stationary object. A movable object is an object that can move, for example, a nearby vehicle or a pedestrian. By contrast, a stationary object is an object that cannot move, for example, a traffic light, a roadway, a structure, or a line.

The object detection apparatus 300 may detect an obstacle located outside the vehicle 100. The obstacle may be one of an object, a puddle on the roadway, an uphill start point, a downhill start point, an inspection pit, a bump, and a curb. The object may be an object having volume and mass.

The object detection apparatus 300 may include a camera 310, a radar 320, a lidar 330, an ultrasonic sensor 340, an infrared sensor 350, and at least one processor such as detection processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide the acquired image to the detection processor 370. The camera 310 may be a mono camera, a stereo camera 310*a*, an Around View Monitoring (AVM) camera 310*b*, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The detection processor 370 may control the overall operation of each unit of the object detection apparatus 300.

The detection processor 370 may detect and track an object based on acquired images. For example, using an image processing algorithm, the detection processor 370 may calculate the distance to the object and the speed relative to the object, determine a type, a location, a size, a shape, and a moving path of the object, and determine content of a detected text.

The detection processor 370 may detect and track an object based on a reflection electromagnetic wave which is formed as a result of reflection a transmission electromagnetic wave by the object. Based on the electromagnetic wave, the detection processor 370 may, for example, calculate the distance to the object and the speed relative to the object.

The detection processor 370 may detect and track an object based on a reflection laser light which is formed as a result of reflection of transmission laser by the object. Based on the laser light, the detection processor 370 may, for example, calculate the distance to the object and the speed relative to the object.

The detection processor 370 may detect and track an object based on a reflection ultrasonic wave which is formed as a result of reflection of a transmission ultrasonic wave by the object. Based on the ultrasonic wave, the detection processor 370 may, for example, calculate the distance to the object and the speed relative to the object.

The detection processor 370 may detect and track an object based on reflection infrared light which is formed as a result of reflection of transmission infrared light by the object. Based on the infrared light, the detection processor 370 may, for example, calculate the distance to the object and the speed relative to the object.

The detection processor 370 may generate object information based on at least one of the following: an image acquired using the camera 310, a reflected electromagnetic wave received using the RADAR 320, a reflected laser beam received using the LIDAR 330, a reflected ultrasonic wave received using the ultrasonic sensor 340, and a reflected infrared light received using the infrared sensor 350.

Object information may be information on a type, a location, a size, a shape, a color, a route, and a speed of an object in the vicinity of the vehicle 100, and content of a detected text.

For example, the object information may indicate the following: whether there is a lane in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle. The object information may be included in the first information.

The detection processor 370 may provide generated object information to the controller 170.

In some implementations, the object detection apparatus 300 may include a plurality of processors 370 or may not include the detection processor 370. For example, each of the camera 310, the radar 320, the lidar 330, the ultrasonic sensor 340, and the infrared sensor 350 may include its own processor.

The object detection apparatus 300 may operate under control of the controller 170 or a processor inside the vehicle 100.

The communication apparatus 400 is configured to perform communication with an external device. The external device may be a nearby vehicle, a mobile terminal, a wearable device, or a server.

To perform communication, the communication apparatus 400 may include at least one of a transmission antenna, a reception antenna, a Radio Frequency (RF) circuit configured to implement various communication protocols, or an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, a Carrier phase Differential GPS (CDGPS) module.

The location information unit 420 may acquire GPS information using the GPS module. The location information unit 420 may transmit the acquired GPS information to the controller 170 or the communication processor 270. The GPS information acquired by the location information unit 420 may be used for autonomous travelling of the vehicle 100. For example, the controller 170 may control autonomous travelling of the vehicle 100 based on GPS information and navigation information acquired by the navigation system 770.

The V2X communication unit 430 is configured to perform wireless communication between a vehicle and a server (e.g., vehicle to infra (V2I) communication), wireless communication between a vehicle and a nearby vehicle (e.g., vehicle to vehicle (V2V) communication), or wireless communication between a vehicle and a pedestrian (e.g., vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 performs communication with a server that provides an intelligent traffic system. The ITS communication unit 460 may receive information on various traffic situations from the server of the intelligence traffic system. Information on a traffic situation may include a level of traffic congestion, a traffic situation on each road, and an amount of traffics in each area.

The communication processor 470 may control the overall operation of each unit of the communication apparatus 400.

The first information may include information received using at least one of the short-range communication unit 410, the location information unit 420, the V2X communication unit 430, the optical communication unit 440, and the broadcast transmission and reception unit 450.

For example, the first information may include information received from a nearby vehicle, the information which is about a location, a model, route, speed, various sensed values, etc. of a nearby vehicle. When information on various sensed values of the nearby vehicle is received, the controller 170 may acquire information on various objects in the vicinity of the vehicle 100, even if the vehicle 100 does not include an additional sensor.

For example, the first information may indicate the following: a type, location, and movement of an object in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle.

In some implementations, the communication apparatus 400 may include a plurality of communication processors 470, or may not include any communication processor 470. In the case where the communication apparatus 400 does not include the communication processor 470, the communication apparatus 400 may operate under control of the controller 170 or a processor of a device inside of the vehicle 100.

In some implementations, the communication apparatus 400 may implement a vehicle multimedia device, together with the user interface apparatus 200. In this case, the vehicle multimedia device may be referred to as a telematics device or an Audio Video Navigation (AVN) device.

The communication apparatus 400 may operate under control of the controller 170.

The driving manipulation apparatus 500 is configured to receive a user command for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user command for steering of the vehicle 100 from a user. The user command for steering may be a command corresponding to a specific steering angle. For example, the user command for steering may correspond to right 45 degrees.

The steering input device 510 may be in the form of a wheel so as to receive a steering input which is made by rotation of the wheel. In this case, the steering input device 510 may be referred to as a steering wheel or a handle.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user command for acceleration of the vehicle from a user.

The brake input device 570 may receive a user input for deceleration of the vehicle 100 from a user. The acceleration input device 530 and the brake input device 570 may be in the form of a pedal.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air toward the inside of the vehicle 100.

The vehicle drive apparatus 600 may include a processor. Each unit of the vehicle dive device 600 may include its own processor.

The vehicle drive apparatus 600 may operate under control of the controller 170.

The vehicle travel system 700 is a system for controlling the overall driving operation of the vehicle. The vehicle travel system 700 may operate in the autonomous driving mode.

The vehicle travel system 700 may perform autonomous driving of the vehicle 100 based on location information of the vehicle 100 and navigation information. The vehicle travel system 700 may include the driving system 710, the parking-out system 740, and the parking system 750.

In some implementations, the vehicle travel system 700 may further include other components in addition to the aforementioned components, or may not include some of the aforementioned component.

In some implementations, the vehicle travel system 700 may include a processor. Each unit of the vehicle travel system 700 may include its own processor.

In some implementations, in the case where the vehicle travel system 700 is implemented as software, the vehicle travel system 700 may be implemented by one or more processors, such as the controller 170.

In some implementations, the vehicle travel system 700 may include at least one of the user interface apparatus 200, the object detection apparatus 300, the communication apparatus 400, the vehicle drive apparatus 600, or the controller 170.

The driving system 710 may control the vehicle 100 to travel autonomously.

The driving system 710 may provide a control signal to the vehicle drive apparatus 600 based on first information so as to allow the vehicle to travel. The vehicle drive apparatus 600 may operate based on the control signal from the driving system 710. Accordingly, the vehicle 100 may travel autonomously.

For example, the driving system 710 may perform a driving operation of the vehicle 100 by providing a control signal to the vehicle drive apparatus 600 based on information on an object received from the object detection apparatus 300.

The driving system 710 may perform a driving operation of the vehicle 100 by providing a control signal to the vehicle drive apparatus 600 based on a signal from an external device through the communication apparatus 400.

The parking-out system 740 may perform an exit operation of the vehicle 100.

The parking-out system 740 may perform an exit operation of the vehicle 100, by providing a control signal to the vehicle drive apparatus 600 based on navigation information from the navigation system 770.

For example, the parking-out system 740 may perform an exit operation of the vehicle 100 by providing a control signal to the vehicle drive apparatus 600 based on object information received from the object detection apparatus 300.

For example, the parking-out system 740 may perform an exit operation of the vehicle 100, by providing a control signal to the vehicle drive apparatus 600 based on a signal received from an external device.

The parking system 750 may control the vehicle 100 to automatically parked.

The parking system 750 may provide a control signal to the vehicle drive apparatus 600 based on first information so as to park the vehicle 100. The vehicle drive apparatus 600 may operate based on a control signal provided by the parking system 750. Accordingly, the vehicle 100 may be automatically parked.

For example, the parking system 750 may perform a parking operation of the vehicle 100, by providing a control signal to the vehicle drive apparatus 600 based on information on an object received from the object detection apparatus 300.

For example, the parking system 750 may perform an operation of parking the vehicle 100 in a parking space, by providing a control signal to the vehicle drive apparatus 600 based on a signal from an external device.

The navigation system 770 may provide navigation information. The navigation information may include at least one selected from among map information, information on a set destination, route information, information on various objects on a roadway, lane information, traffic information, and location information of a vehicle.

The navigation system 770 may include an additional memory and a processor. The additional memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, and a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal. The information acquired by the sensing unit 120 may be included in the first information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under control of the controller 170. In particular, the power supply unit 190 may receive power from, for example, a battery inside the vehicle 100.

The controller 170 may control the overall operation of each unit inside the vehicle 100

The controller 170 may be referred to as an Electronic Controller (ECU).

When the vehicle 100 is in the autonomous mode, the controller 170 may perform autonomous driving of the vehicle 100 based on information acquired using a device provided in the vehicle 100. For example, the controller 170 may control the vehicle 100 based on navigation information provided by the navigation system 770 and information provided by the object detection apparatus 300 and the communication apparatus 400. When the vehicle 100 is in the manual mode, the controller 170 may control the vehicle based on an input signal corresponding to a user command received by the driving manipulation apparatus 500. When the vehicle 100 is in the remote control mode, the controller 170 may control the vehicle 100 based on a remote control signal received by the communication apparatus 400.

Various processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Hereinafter, the interface system for a vehicle according to the present disclosure will be described in more detail.

The interface system according to an implementation may include a detachable interface apparatus 900 and a user interface apparatus 200. In addition, the interface system according to an implementation may further include a mobile terminal 10.

The user interface apparatus 200 is provided in the vehicle 100. The user interface apparatus 200 may include a plurality of display units provided in the vehicle 100.

The detachable interface apparatus 900 may be attached to one region on a plurality of display units 251 provided in the vehicle 100 or may be detached from the plurality of display units 251.

In some implementations, the detachable interface apparatus 900 may be provided in the vehicle 100 or the mobile terminal 100. The detachable interface apparatus 900 may be detachable from the vehicle 100 or the mobile terminal 10.

When it is determined that the detachable interface apparatus 900 becomes attached to any one display unit 251 selected from among the plurality of display units 251, the user interface apparatus 200 may display a preset user menu corresponding to a type of a display unit 251, to which the detachable interface apparatus 900 is attached (hereinafter referred to as a selected display unit 251), on the selected display unit 251.

Figure 8:
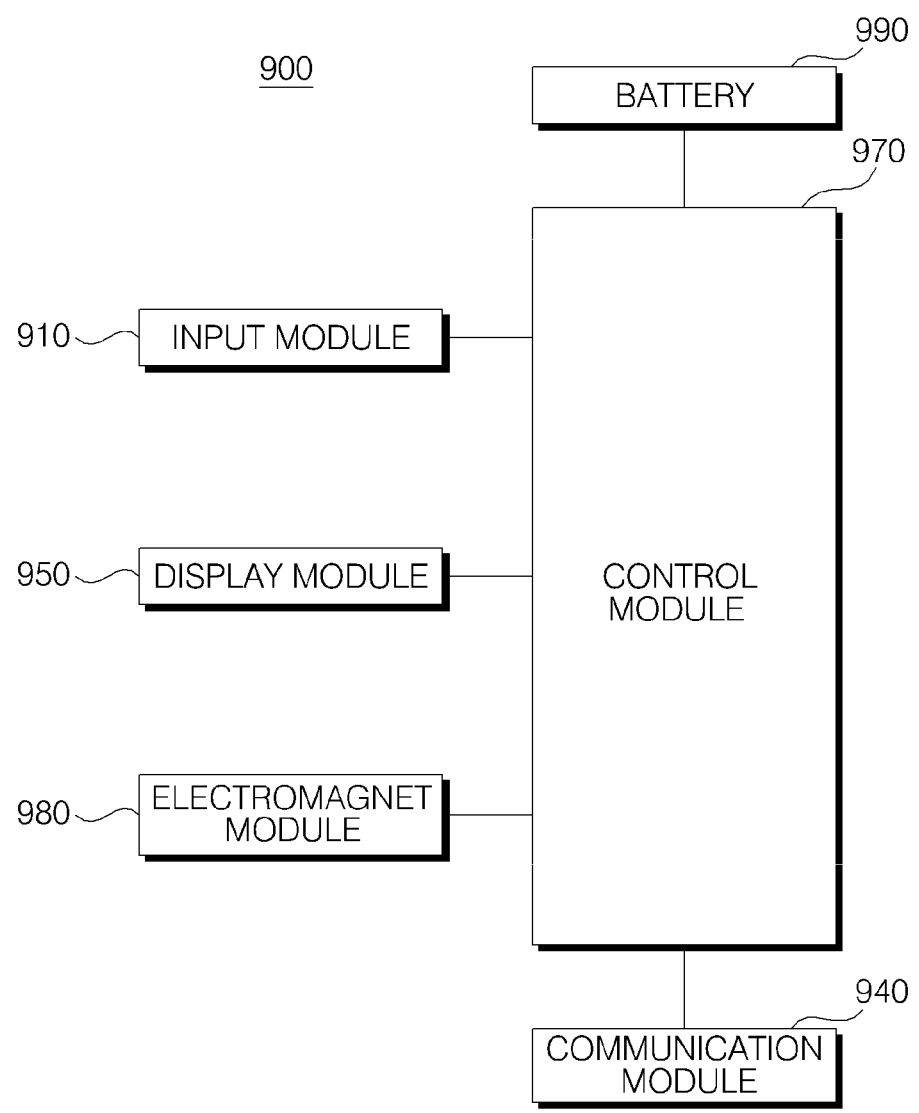
FIG. 8 is a block diagram illustrating an example of the structure of a detachable interface apparatus according to an implementation.

FIG. 8 is a block diagram illustrating the structure of a detachable interface apparatus according to an implementation. Although the example of FIG. 8 illustrates using electromagnets to control adhesion of the detachable interface apparatus 900 to the display unit 251, in general any suitable controllable adhesion technique may be used.

The detachable interface apparatus 900 may include an input module 910, a display module 950, a communication module 940, a control module 970, an electromagnet module 980, and a battery 990.

The input module 910 receives a user input. The input module 910 may be electrically connected to the control module 970 to provide a received user input to the controller 970.

The input module 910 may include at least one selected from among a voice input device, a gesture input device, a touch input device, and a mechanical input device.

The display module 950 may output an image based on a signal provided by the control module 970. The display module 950 may be electrically connected to the control module 970.

The display module 950 and the input module 910 may be stacked to thereby form a touch screen 915. In this case, the touch screen 915 may operate as both of the input module 910 and the display module 950.

The communication module 940 may wirelessly communicate with a device which is able to perform communication. For example, the communication module 940 may exchange data with the communication apparatus 400 of the vehicle 100 or a specific mobile terminal 10.

The communication module 940 may be electrically connected to the control module 970 and thus controlled by the control module 970. The communication module 940 may receive data transmitted from the communication apparatus 400 or the specific mobile terminal 10, and provide the received data to the control module 970. The control module 970 may transmit data to the communication apparatus 400 or the specific mobile terminal 10 by using the communication module 940.

The battery 990 may supply power to each module of the detachable interface apparatus 900. Each module of the detachable interface apparatus 900 may operate by power supplied from the battery 990.

The electromagnet module 980 may generate a magnetic force by the control of the control module 970. The electromagnet module 980 may change the magnet force by the control of the control module 970. For example, the electromagnet module 980 is an electromagnet having a variable magnet force. Alternatively, the electromagnet module 980 may be a permanent magnet having a fixed magnet force.

In the case the electromagnet module 980 generates a magnetic force, an attractive force and a repulsive force may occur between the electromagnet module 980 and other material having a magnetic force. Accordingly, the electromagnet module 980 may be attached to a metal material or any other material having a magnetic force.

The control module 970 may control various modules of the detachable interface apparatus 900. The control module 970 may control the various modules of the detachable interface apparatus 900 based on a control signal from the interface processor 270 of the user interface apparats 200 (hereinafter, referred to as a processor 270). Accordingly, the processor 270 of the user interface 200 may control the detachable interface apparatus 900.

The control module 970 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Hereinafter, the user interface apparatus 200 according to the present disclosure will be described. The user interface apparatus 200 provided in the vehicle 100 may include a plurality of display units and the processor 270.

For example, the plurality of display units 251 may include an instrument panel 251a disposed in front of a driver's seat, a Center Information Display (CID) 251b disposed at the center facia, a front-passenger seat display 251e disposed in front of the front-passenger seat, a Rear Seat entertainment (RSE) 251d disposed at one rear surface of each front seat 110FL and 110FR, a Head Up Display (HUD) 251C disposed at one region of a windshield, and a side display disposed at one region of a side mirror.

Each of the plurality of display units 251 may include a display panel and a magnet.

The magnet may be an electromagnet or a permanent magnet. The magnet may be disposed at the rear surface of the display panel. When the magnet is an electromagnet, the processor 270 may adjust the magnetic force of the electromagnet.

The magnet may be in the form of a panel disposed on the rear surface of the display panel. The magnet may be in the form of a plurality of small magnets disposed at the rear surface of the display panel.

When an attractive force occurs between the magnet disposed on the rear surface of the display panel and the electromagnet module 980 of the detachable interface apparatus 900, the detachable interface apparatus 900 may be attached to the front surface of the display panel.

The processor 270 may adjust the magnetic force of an electromagnet disposed in at least one of the rear surface of the display panel and the detachable interface apparatus 900, so that an attractive force occurs between the magnet disposed at the rear surface of the display panel and the electromagnet module 980 of the detachable interface apparatus 900. Accordingly, the processor 270 may control at least one of the detachable interface apparatus 900 and the plurality of display units 251, so that the detachable interface apparatus 900 is attached to any one of the plurality of display units 251.

When the electromagnet module 980 of the detachable interface apparatus 900 is an electromagnet having a variable magnetic force, the processor 270 may provide a control signal to the control module 970 of the detachable interface apparatus 900 to adjust the magnetic force of the electromagnet module 980.

When a magnet disposed on the rear surface of the display panel is an electromagnet having a variable magnetic force, the processor 270 may adjust the magnetic force of the electromagnet.

When it is determined that the detachable interface apparatus 900 is attached to any display unit 251 selected from the plurality of display units 251, the processor 270 may display a preset user menu corresponding to a type of a selected display unit 251 on the selected display unit 251.

For example, the type of the selected display unit 251 may be the instrument panel 251*a*, the CID 251*b*, the RSE 251*d*, the front-passenger seat display 251*e*, and the side mirror display 251*s*.

In the case where the detachable interface apparatus 900 is attached to any display unit 251 selected from the plurality of display units 251, the processor 270 may detect a magnetic change occurring in the selected display unit 251 to which the detachable interface apparatus 900 is attached. Accordingly, the processor 270 may determine whether the detachable interface apparatus 900 is attached to any display unit 251 selected from the plurality of display units 251.

In addition, the processor 270 may determine the display unit 251 to which the detachable interface apparatus 900 is attached among the plurality of display units 251. For example, the processor 270 may determine that the detachable interface apparatus 900 becomes attached to the CID 251*b*.

The user menu is a menu screen displayed on the selected display unit 251. The user menu may be a menu for controlling one or more devices included in the vehicle 100.

The fact that a user menu is preset to correspond to a type of a selected display unit 251 means that a different type of the user menu is output depending on a type of the selected display unit 251. For example, the types of the user menu may include a driver menu, a front-passenger seat menu, and a rear-passenger seat menu.

For example, when it is determined that the type of the selected display unit 251 is the instrument panel 251*a*, the processor 270 may display a preset driver menu on the instrument panel 251*a*. In this case, a preset user menu corresponding to the instrument panel 251*a* is a driver menu.

In some implementations, the driver menu is a preset menu. For example, data about the driver menu may be pre-stored in a memory included in the processor 270.

The driver menu is a menu for providing functions relevant to a driver. As examples, the driver menu may provide functions of setting a control mode of the vehicle 100, setting a function of an Advanced Driver Assistance System (ADAS), and setting a screen of the instrument panel 251*a*.

When it is determined that the detachable interface apparatus 900 is attached to the instrument panel 251*a*, the processor 270 may display a driver menu, stored in the memory, on the instrument panel 251*a*.

For example, when it is determined that the type of the selected display unit 251 is the CID 251*b* or the RSE 251*d*, the processor 270 may display a preset passenger menu on the CID 251*b* or the RSE 251*d* to which the detachable interface apparatus 900 is attached.

In some implementations, the passenger menu is also a preset menu. For example, data about the passenger menu may be pre-stored in a memory included in the processor 270.

The passenger menu is a menu for providing functions relevant to a passenger.

In some implementations, the passenger menu includes a rear-passenger seat menu for a passenger sitting in a rear seat, and a front-passenger seat menu for a passenger sitting in the front-passenger seat.

For example, when the type of the selected display unit 251 is determined to be the CID 251*b*, the processor 270 may display a preset front-passenger seat menu on the CID 251*b* to which the detachable interface apparatus 900 is attached.

As examples, the front-passenger seat menu may provide functions of setting a destination, setting a control mode of the vehicle 100, setting a function of the ADAS, setting a screen of the CID 251*b*, setting inner temperature of the vehicle 100, selecting an entertainment function, accessing the Internet, setting a seat position, etc.

When it is determined that the detachable interface apparatus 900 is attached to the CID 251*b*, the processor 270 may display a front-passenger seat menu, stored in the memory, on the CID 251*b*.

In addition, even when it is determined that the detachable interface apparatus 900 is attached to the front-passenger seat display 251*e*, the processor 270 may display the front-passenger seat menu, stored in the memory, in the passenger seat display 251*e*.

For example, when it is determined that the type of the selected display unit 251 is the RSE 251*d*, the processor 270 may display a preset passenger menu on the RSE 251*d* to which the detachable interface apparatus 900 is attached.

For example, a rear-passenger seat menu may provide functions of setting a destination, playing music or movies, setting a screen of the RSE 251*d*, setting temperature of a rear seat, selecting an entertainment function, accessing the Internet, and setting a rear seat position.

When it is determined that detachable interface apparatus 900 is attached to the RSE 251*e*, the processor 270 may display a rear-passenger seat menu, stored in a memory, on the RSE 251*d*.

According to another implementation, when the entire dashboard of the vehicle 100 is implemented as a display, the processor 270 may display a preset menu, which corresponds to where the detachable interface apparatus 900 is attached, in the surroundings of the detachable interface apparatus 900.

For example, when it is determined that the detachable interface apparatus 900 is attached to the first region over the entire display region of the dashboard which is divided into three regions (including a first region positioned in front of the driver's seat, the second region positioned in front of the center fascia, and the third region positioned in front of the passenger seat), the processor 270 may output a driver menu in the first region. When it is determined that the detachable interface apparatus 900 is attached to the second region, the processor 270 may display, in the second region, a control menu for controlling every device provided in the vehicle 100. When it is determined that the detachable interface apparatus 900 is attached to the third region, the processor 270 may display an occupant menu in the third region.

The detachable interface apparatus 900 may include: an input module 910 which receives a user input for controlling the vehicle 100; a display module 950 configured to display a graphic object for user to manipulate a user menu; and a communication module 940 which transmits a user input to a communication apparatus of the vehicle 100.

The input module 910 and the display module 950 may be stacked to be implemented as a touch screen 915. In this case, a button may be displayed on the touch screen 915 to receive a user input.

The control module 970 of the detachable interface apparatus 900 may transmit a user input, received through the input module 910, to the communication apparatus 400 of the vehicle 100 through the communication module 940.

The communication apparatus 400 may receive a user input acquired using the detachable interface apparatus 900. The communication apparatus 400 may transmit the user input to the processor 270 through an interface provided in the user interface apparatus 200.

Through the communication apparatus 400, the processor 270 may acquire a user input applied to the detachable interface apparatus 900.

The processor 270 may provide a control signal to the touch screen 915 of the detachable interface apparatus 900 so that a graphic object for manipulating a user menu is displayed.

When the detachable interface apparatus 900 is determined to be attached to a selected display unit 251, the processor 270 may display a user menu on the selected display unit 251. The processor 270 may transmit a control signal to the detachable interface apparatus 900 so that a graphic object for manipulating a user menu is displayed on the touch screen 915 of the detachable interface apparatus 900.

Based on a received control signal, the control module 970 of the detachable interface apparatus 900 may display, on the touch screen 915, a graphic object for manipulating a user menu.

For example, the graphic object for manipulating a user menu may be a selection button and an arrow indicating a particular button included in the user menu. In this case, arrows respectively indicating the top, down, right, and left sides may be displayed on the touch screen 915. In addition, a circle equivalent to the selection button may be displayed at the center of the touch screen 915.

When it is determined that the detachable interface apparatus 900 is separate from a plurality of display units 251, the processor 270 may provide a control signal so that a remote control menu (hereinafter, referred to as a first menu) for controlling one or more devices provided in the vehicle 100 is displayed on the detachable interface apparatus 900.

The control module 970 of the detachable interface apparatus 900 receives the control signal from the processor 270 through the communication module 940. The control module 970 may display the first menu on the touch screen 915 based on the control signal. Accordingly, the detachable interface apparatus 900 may output the first menu to the display module 950.

The first menu may include a button for controlling one or more devices provided in the vehicle 100. For example, the first menu may include a button for controlling various devices included in the vehicle drive apparatus 600.

For example, the first menu may include a button for controlling at least one of: the power train drive unit 610, the chassis drive unit 620, the door/window drive unit 630, the safety apparatus drive unit 640, the lamp drive unit 650, or the air conditioner drive unit 660.

For example, the first menu may include functions related to setting a destination, setting a driving mode of the vehicle 100 (for example, an eco-mode, a safe mode, a sport mode, etc.), setting inner temperature of the vehicle 100, setting entertainment, and setting lighting of the vehicle 100.

For example, when it is determined that a button related to setting inner temperature of the vehicle 100 is touched, the control module 970 of the detachable interface apparatus 900 may display, on the touch screen, 915 a menu for setting inner temperature of the vehicle 100. The control module 970 may transmit, to the user interface apparatus 200, a user input which corresponds to the menu for setting inner temperature. The processor 270 of the user interface apparatus 200 may control the air conditioner drive unit 660 based on the received user input. Accordingly, the air conditioner drive unit 660 may operate so that the inner temperature of the vehicle 100 reaches a temperature value input by a user.

For example, when it is determined that a button related to an entertainment function is touched, the control module 970 of the detachable interface apparatus 900 may display, on the touch screen 915, an image corresponding to various contents stored in the memory 140. The control module 970 may transmit a user input regarding any of various displayed image to the user interface apparatus 200. The processor 270 may output a selected content to the output unit 250 based on the user input transmitted by the control module 970. Accordingly, using the detachable interface apparatus 900, a user is able to select and display a desired video or music from among videos and music stored in the memory 140 of the vehicle.

According to another implementation, when it is determined that the detachable interface apparatus 900 is separate from a plurality of display units 251, the processor 270 may output, to the detachable interface apparatus 900, a menu for controlling the display to which the detachable interface apparatus 900 was attached most recently. For example, when the detachable interface apparatus 900 is detached from the instrument panel 251a, the processor 270 may control the detachable interface apparatus 900 to output a menu for controlling a device corresponding to the instrument panel 251a. The device corresponding to the instrument panel 251a is a preset device, and information about the preset device is stored in a memory of the processor 270. For example, the device corresponding to the instrument panel 251a may be the power train drive unit 610 or the chassis drive unit 620, which are directly related to driving of the vehicle 100.

The user interface apparatus 200 may further include an interface unit (now shown). The interface unit may acquire information provided by various units of the vehicle 100. For example, the interface unit may acquire information provided by the object detection apparatus 300, the communication apparatus 400, the driving manipulation apparatus 500, the navigation system 770, the sensing unit 120, the interface unit 130, the memory 140, and the controller 170.

The interface unit transmits the acquired information to the processor 270.

When it is determined, based on vehicle state information acquired using the interface unit, that the vehicle 100 is in the autonomous mode, the processor 270 may output a first menu to the detachable interface apparatus 900 which is separate from the plurality of display units 251.

The vehicle state information is information indicating various states of the vehicle 100. For example, the vehicle state information may include information about a control mode of the vehicle 100. The control mode of the vehicle 100 may include a manual mode in which a driver controls the vehicle 100, an autonomous mode in which the controller 170 controls the vehicle 100 without manipulation of the driver, and a remote control mode in which an external device other than the vehicle 100 controls the vehicle 100.

The processor 270 may determine a control mode of the vehicle 100 based on vehicle state information.

When it is determined, based on vehicle state information, that the vehicle 100 is in the autonomous mode and that the detachable interface apparatus 900 is separate from the plurality of display units 251, the processor 270 may transmit a control signal to the detachable interface apparatus 900 so that the first menu is output to the detachable interface apparatus 900.

The control module 970 of the detachable interface apparatus 900 may output the first menu to the display module 950 based on a received control signal.

When the vehicle 100 is determined to be in the manual mode, the processor 270 may deactivate the detachable interface apparatus 900 which is separate from the plurality of display units 251.

Based on vehicle state information, the processor 270 may determine whether the vehicle 100 is in the manual mode. When it is determined that the vehicle 100 is in the manual mode, the processor 270 may transmit a signal for deactivating the detachable interface apparatus 900 to the detachable interface apparatus 900 through the communication apparatus 400. Upon receiving the signal, the control module 970 of the detachable interface apparatus 900 may turn off the touch screen 915.

However, even when the vehicle 100 is in the manual mode, a passenger other than a driver may use the detachable interface apparatus 900 by detaching the detachable interface apparatus 900 from the display unit 251. Accordingly, when it is determined that a person other than the driver is using the detachable interface apparatus 900 which is separate from the plurality of display units 251, the user interface system according to the present disclosure may activate the detachable interface apparatus 900.

When the vehicle 100 is determined to be in the manual mode, the processor 270 may determine whether the driver is manipulating the detachable interface apparatus 900, based on an image of the inside of the vehicle 100 acquired using the internal camera 220. When it is determined that the driver is manipulating the detachable interface apparatus 900, the processor 270 may deactivate the detachable interface apparatus 900 which is separate from the plurality of display units 251.

When it is determined that a passenger other than the driver is manipulating the detachable interface apparatus 900, the processor 270 may output the first menu to the detachable interface apparatus 900 which is separate from the plurality of display units 251.

Based on an image of the inside of the vehicle 100 acquired using the internal camera 220, the processor 270 may determine who is manipulating the detachable interface apparatus 900 which is separate from the plurality of display units 251.

When it is determined, based on the image of the inside of the vehicle 100, that a passenger other than the driver is manipulating the detachable interface apparatus 900, the processor 270 may transmit a control signal to the detachable interface apparatus 900 so that the first menu is output to the detachable interface apparatus 900.

The control module 970 of the detachable interface apparatus 900 may output the first menu to the touch screen 915 based on the received control signal.

When it is determined that the vehicle 100 is in the manual mode and that the detachable interface apparatus 900 is attached to the display unit 251 selected from the plurality of display units 251, the processor 270 may increase (e.g., maximize) an adhesive force of the detachable interface apparatus 900.

Using a magnetic force of an electromagnet module 980 of the detachable interface apparatus 900 or a magnetic force of at least one of electromagnets provided in the plurality of display units 251, the processor 270 may adjust a force of adhesion between the detachable interface apparatus 900 and the plurality of display units 251.

When it is determined that the vehicle 100 is in the manual mode and that the detachable interface apparatus 900 is attached to any one display unit 251 selected from among the plurality of display units 251, the processor 270 may increase (e.g., maximize) a force of adhesion between the detachable interface apparatus 900 and the plurality of display units 251 so that a user behind the wheel is not allowed to separate the detachable interface apparatus 900 from the selected display unit 251.

If the user behind the wheel uses the detachable interface apparatus 900 which is separate from the plurality of display units 251, the user may be distracted from driving and this may cause an accident. Thus, the interface system according to the present disclosure prevents a driver from separating the detachable interface apparatus 900 from the display unit 251.

In addition, when it is determined, further based on an image of the inside of the vehicle 100 acquired through the internal camera 220, that a person other than the driver attempts to detach the detachable interface apparatus 900 from a selected display unit 251, the processor 270 may adjust an adhesive force of the detachable interface apparatus 900 to a default degree.

The interface system according to the present disclosure may include the detachable interface apparatus 900, the user interface apparatus 200, and a mobile terminal 10.

The detachable interface apparatus 900 may be provided in the vehicle 100 or the mobile terminal 10.

The mobile terminal 10 may be implemented in any of various forms, such as a phone, a watch, a pair of glasses, an earphone, a clothes, a laptop, and a tablet. In the following description, it is assumed that the mobile terminal 10 is implemented in the form of a watch.

When the detachable interface apparatus 900 is provided in the vehicle 100, the detachable interface apparatus 900 is wirelessly connected to the user interface apparatus 200. Accordingly, by providing a control signal to the detachable interface apparatus 900, the processor 270 of the user interface apparatus 200 may control the detachable interface apparatus 900. The processor 270 of the user interface apparatus 200 is able to receive a user input via the detachable interface apparatus 900, and therefore, a user is able to manipulate the user interface apparatus 200 using the detachable interface apparatus 900.

When the detachable interface apparatus 900 is provided in the mobile terminal 10, the detachable interface apparatus 900 is wirelessly connected to the mobile terminal 10. Accordingly, by providing a control signal to the detachable interface apparatus 900, a processor of the mobile terminal 10 may control the detachable interface apparatus 900. The processor of the mobile terminal 10 is able to receive a user input through the detachable interface apparatus 900, and therefore, a user is able to manipulate the mobile terminal 10 using the detachable interface apparatus 900.

Even when the detachable interface apparatus 900 is provided in the vehicle 100, the detachable interface apparatus 900 may be wirelessly connected to the mobile terminal 10. For example, when the mobile terminal 10 request communication connection from the detachable interface apparatus 900 or when a distance between the mobile terminal 10 and the detachable interface apparatus 900 is equal to or smaller than a preset distance (for example, when the detachable interface apparatus 900 and the mobile terminal 10 are tagged), the mobile terminal 10 and the detachable interface apparatus 900 may be wirelessly connected.

The detachable interface apparatus 900 may be attached to any display unit 251 selected from the plurality of display units 251 provided in the mobile terminal 10 or the vehicle 100.

In one implementation, the user interface apparatus 200 may be wirelessly connected to the mobile terminal 10 in the case where the detachable interface apparatus 900 provided in the mobile terminal 10 becomes attached to one region on the plurality of display units 251.

When it is determined that the detachable interface apparatus 900 provided in the mobile terminal 10 becomes attached to one region on the plurality of display units 251, the processor 270 of the user interface apparatus 200 may connect to the mobile terminal 10 to acquire one or more information items from the mobile terminal 10.

In another implementation, the user interface apparatus 200 may be wirelessly connected to the mobile terminal 10 when the detachable interface apparatus 900 provided in the vehicle 100 is wirelessly connected to the mobile terminal 10.

When it is determined that the detachable interface apparatus 900 provided in the vehicle 100 is wirelessly connected to the mobile terminal 10, the processor 270 of the user interface apparatus 200 may acquire one or more information items from the mobile terminal 10.

The processor 270 of the user interface apparatus 200 may acquire one or more information items from the mobile terminal 10 when the user interface apparatus 200 is wirelessly connected to the mobile terminal.

Information acquired from the mobile terminal 10 may be information stored in the mobile terminal 10, and information acquired by the mobile terminal 10 from another device.

For example, information acquired from the mobile terminal 10 is at least one of information related to a user of the mobile terminal 10, information related to an application of the mobile terminal 10, or information related to the mobile terminal 10.

The information related to a user of the mobile terminal 10 may include: the user's biometric information (for example, information about the user's temperature and pulse rate); the user's biometric information stored in the mobile terminal 10 (for example, stored information about the user's finger print or iris); the user's various authentication information stored in the mobile terminal 10 (for example, a preset passcode or a pattern for locking/unlocking a screen); the user's personal information (for example, information about the user's schedule, point of interest (POI), age, name, language, and acquisition of a driving license); and information about configuration of a menu screen previously set by the user.

The information related to an application of the mobile terminal 10 may include information about an application stored in the mobile terminal, an application being executed, and data usage per application.

The information related to the mobile terminal 10 may include information about a type of the mobile terminal 10 (for example, a watch type, a glasses type, a phone type, a tablet type, an earphone type, etc.), and information about specifications of the mobile terminal 10.

The processor 270 may acquire one or more information items from the mobile terminal 10 through the communication apparatus 400. The processor 270 may acquire one or more information items from the mobile terminal 10 through the detachable interface apparatus 900.

Based on user-related information from among one or more information items acquired from the mobile terminal 10, the processor 270 may determine a menu which is to be displayed on a selected display unit 251.

For example, when it is determined, based on the user-related information, that a user is a driver, the processor 270 may display a preset driver menu on the selected display unit 251.

When it is determined that a user is a passenger, the processor 270 may display a preset passenger menu on the selected display unit 251.

For example, when it is determined, based on the user-related information, that there is a menu screen set by a user (hereinafter, referred to as a user customized menu), the processor 270 may display the user customized menu on a display unit 251 to which a detachable interface unit is attached. The user customized menu is a menu having screen configuration and functions set by the user.

For example, when it is determined, based on the user-related information, that a user is not allowed to drive (for example, when the user is determined to be under legal adult age, have no driving license, or be drunk), the processor 270 may display, on a selected display unit 251, a menu by which it is not possible to control a driving-related function. For example, the driving-related function may be a function of changing a control mode of the vehicle 100, or a function of manipulating movement of the vehicle 100.

For example, when it is determined, based on the user-related information, that a user is a driver, the processor 270 may display a menu having no entertainment function on the selected display unit 251.

For example, the processor 270 may change a language of the menu in response to a user's language determine based on the user-related information.

The processor 270 may acquire one or more devices provided in the vehicle, based on one or more information items acquired from the mobile terminal 10.

One or more devices provided in the vehicle 100 may be at least one of the vehicle drive apparatus 600, the navigation system 770, and the user interface apparatus 200.

The processor 270 may control one or more devices provided in the vehicle 100, based on the user-related information.

For example, when it is determined, based on a user's biometric information or various authentication information, that a user has no right to control the vehicle 100, the processor 270 may deactivate every device provided in the vehicle 100.

For example, the processor 270 may set a destination of the vehicle based on information about a user's schedule.

For example, the processor 270 may control the air conditioner unit 660 based on information about a user's temperature.

For example, the processor 270 may change a driving mode of the vehicle 100 (for example, a comfort mode, a sport mode, a safe driving mode, a high speed mode, etc.) depending on a user's emotional state determined based on the user's biometric information.

For example, when it is determined, based on user-related information, that a user is now allowed to drive (for example, when the user is determined to be under legal adult age, have no driving license, or be drunk), the processor 270 may control the vehicle 100 so that the vehicle 100 shifts to the autonomous mode.

For example, the processor 270 may control a preset device, which corresponds to a type of the selected display unit 251 among one or more devices provided in the vehicle 100.

The interface system according to the present disclosure includes a device which is preset depending on a type of each display unit 251. The type of each display unit 251 may be the instrument panel 251*a*, the front-passenger seat display 251*e*, the RSE 251*d*, the CID 251*b*, etc.

For example, a preset device corresponding to the instrument panel 251*a* may include: the driving manipulation apparatus 500; a device included the air conditioner drive unit 660 for discharging air toward the driver's seat; and the navigation system 770. The preset device corresponding to the instrument panel 251*a* may include at least one of: an output unit 250 disposed in the driver's seat; the input unit 210; the safety apparatus drive unit 640; or the door/window drive unit 630.

For example, a preset device corresponding to the front-passenger seat display 251*e* may include: a device included in the air conditioner drive unit 660 for discharging air toward the front-passenger seat; and the navigation system 770. A preset device corresponding to the front-passenger seat display 251*e* may include at least one of: an output unit 250 disposed at the front-passenger seat; the input unit 210; the safety apparatus drive unit 640; or the door/window drive unit 630.

For example, a preset device corresponding to the RSE 251*d* may include at least one of: a device included in the air conditioner drive unit 660 for discharging air toward a rear seat; or the navigation system 770. The device preset to correspond to the RSE 251*d* may include at least one of: an output unit 250 disposed at a rear seat; the input unit 210; the safety apparatus drive unit 640; or the door/window drive unit 630.

For example, a preset device corresponding to the CID 251*b* may include every device provided in the vehicle 100.

For example, the processor 270 may control the air conditioner drive unit 660 or a hot wire of a seat based on a user's temperature. The processor 270 may adjust temperature of a passenger occupied seat based on a passenger's temperature, by controlling the air conditioner device 660 discharging air toward a seat corresponding to a location of the selected display unit 251 or by controlling a hot wire of the corresponding seat.

The menu for controlling a preset device corresponding to a type of a display unit 251 may be referred to as a control menu corresponding to the type of the corresponding display unit 251. For example, a menu for controlling a preset device corresponding to the instrument panel 251*a* may be referred to as a control menu corresponding to the instrument panel 251*a*.

In the case where the detachable interface apparatus 900 is attached to any selected display unit 251, the processor 270 may provide a control signal so that a control menu corresponding to a type of the selected display unit 251 is output to the mobile terminal 10. Based on the control signal, the mobile terminal 10 may output the control signal corresponding to the type of the selected display unit 251.

For example, when it is determined that the detachable interface apparatus 900 provided in the mobile terminal 10 becomes attached to the instrument panel 251*a*, the processor 270 may provide a control signal so that a control menu corresponding to the instrument panel 251*a* is output to the mobile terminal 10. In this case, based on the control signal, the mobile terminal 10 may output the control menu corresponding to the instrument panel 251*a*.

Based on application-related information from among one or more information items acquired from the mobile terminal 10, the processor 270 may output, to the output unit 250, at least one of a screen or a sound of an application which is being executed in the mobile terminal 10.

The screen and the sound of the application may include at least one screen and at least one sound that is output during execution of the application in the mobile terminal 10.

Based on the application-related information acquired from the mobile terminal 10 being accessed by the user interface apparatus 200, the processor 270 may determine which application is being executed in the mobile terminal 10. Based on the application-related information, the processor 270 may determine which application is being executed in the mobile terminal 10.

When it is determined that an application is being executed in the mobile terminal 10, the processor 270 may acquire data about the application's screen and/or sound which is included in the application-related information.

Based on the data about the application's screen and/or sound, the processor 270 may output the application's screen to the display unit 251 and/or output the application's sound to the sound output unit 252. For example, the processor 270 may output the application's screen to the selected display 251, and/or may output the application's sound to a sound output unit corresponding to the selected display unit 251.

When it is determined, based on vehicle state information acquired using an interface unit, that the vehicle 100 is in the manual mode, the processor 270 may reduce (e.g., turn off) the output of the application's screen and/or sound. This may help prevent the driver from being distracted.

However, even in a state in which the vehicle 100 is in a manual driving mode, if it is determined that the user is not a driver, e.g., based on an image of the inside of the vehicle 100 or information acquired from the mobile terminal 10, then the processor 270 may output the screen and/or sound of an application being executed in the mobile terminal 10.

As another example, even in the state in which the vehicle 100 is in the manual driving mode, if it is determined that the application being executed in the mobile terminal 10 is a navigation application, and that a type of a display unit 251 to which the detachable interface apparatus 900 is attached is the instrument panel 251*a* or the CID 251*b*, then the processor 270 may output the screen and/or sound of the navigation application to the output unit 250 of the vehicle 100.

Based on information acquired through an interface unit, the processor 270 may determine whether the information satisfies one or more criteria. For example, the criteria may indicate whether the information is significant information needed to be recognized by a user. Such criteria may include various factors that determine an importance of the information.

For example, the significant information may be information about safety of the vehicle 100 (for example, information about an object which possibly collides with the vehicle 100), or information about a path of travel of the vehicle 100 (for example, information about a traffic sign indicating a destination of the vehicle 100, or information about a traffic law for a road in which the vehicle 100 is travelling).

Through an interface unit, the processor 270 may receive information acquired by various devices provided in the vehicle 100.

For example, when it is determined, based on the information acquired using the interface, that there is an object which possibly collides with the vehicle 100, that there is a traffic law possibly to be violated by the vehicle 100, and that there is a traffic sign indicating a preset destination, then the processor 270 may determine based on these criteria that there is significant information.

When it is determined that there is significant information, the processor 270 may provide, to the mobile terminal 10, a signal for outputting an alarm which corresponds to the significant information.

Based on the signal provided by the processor 270, the mobile terminal 10 may output an alarm for notifying the significant information.

The alarm corresponding to the significant information includes at least one of sound, an image, or vibration which notifies the significant information.

The signal provided by the processor 270 to the mobile terminal 10 is a control signal for outputting at least one of sound, an image, or vibration which outputs significant information to the mobile terminal 10.

Based on a type of the selected display unit 251, the processor 270 may determine whether there is significant information.

Whether there is significant information may be determined depending on a type of a display to which the detachable interface apparatus 900 is attached.

The type of the selected display unit 251 may indicate a location of an occupant. Significant information needed to be recognized by the occupant varies depending on the location of the occupant.

For example, information about a traffic law possibly to be violated by the vehicle 100 or about a traffic sign indicating a destination is significant information needed to be recognized by a user behind the wheel, but it is not significant information for a user sitting in a front-passenger seat or a rear seat.

Accordingly, the processor 270 may determine an occupant's seat based on the type of the selected display unit 251, and which significant information needs to be recognized by the occupant on the occupant's seat. Based on information acquired using the interface unit, the processor 270 may determine whether there is significant information.

For example, when it is determined that the type of the selected display unit 251 is the front-passenger seat display 251*e* or the RSE 251*d*, the processor 270 may determine that information about a traffic law possibly to be violated by the vehicle 100 or about a traffic sign indicating a destination is not significant information, and that only information about safety of the vehicle 100 is significant information. Based on first information acquired through the interface unit, the processor 270 may determine whether there is information about safety of the vehicle 100.

For example, when it is determined that the type of the selected display unit 251 is the instrument panel 251, the processor 270 may determine that information about a traffic law possibly to be violated by the vehicle 100, about a traffic sign indicating a destination, and about safety of the vehicle 100 is significant information. In this case, based on first information acquired using the interface unit, the processor 270 may determine whether there is information related to at least one of: a traffic law to be possibly violated by the vehicle 100; a traffic sign indicating a destination; or an object possibly colliding with the vehicle 100.

When it is determined that the type of the selected display unit 251 is the side mirror display 251*s*, the processor 270 may determine that information about an object existing in a lateral blind spot within a side area not seen through a side mirror of the vehicle 100 is significant information. In this case, when an object exists in a blind spot on one side of the vehicle 100, the processor 270 may determine that there is significant information.

The processor 270 may determine a way of outputting an alarm, based on a type of the mobile terminal 10 which is determined based on one or more information items acquired from the mobile terminal 10.

The processor 270 may determine the type of the mobile terminal 10 based on information related to the mobile terminal 10. The type of the mobile terminal 10 includes a phone type, a watch type, a glasses type, an earphone, etc.

There may be different ways of outputting an alarm to be easily recognized by a user depending on the type of the mobile terminal 10.

For example, when it is determined that the mobile terminal 10 is a watch type, the processor 270 may determine vibration or sound as a way of outputting an alarm for notifying significant information. When it is determined that there is significant information, the processor 270 may provide a control signal to the mobile terminal 10 so that sound for notifying the significant information or vibration is output to the watch-type mobile terminal 10.

For example, when it is determined that the mobile terminal 10 is a glasses type, the processor 270 may determine an image or sound as a way of outputting an alarm for notifying significant information. In this case, when it is determined that there is significant information, the processor 270 may provide a control signal to the mobile terminal 10 so that an image or sound for notifying significant information is output to the glasses-type mobile terminal 10.

For example, when it is determined that the mobile terminal 10 is an earphone type, the processor 270 may determine sound as a way of outputting an alarm for notifying significant information. In this case, when it is determined that there is significant information, the processor 270 may provide a control signal to the mobile terminal 10 so that sound for notifying the significant information is output to the earphone-type mobile terminal 10.

When it is determined that the detachable interface apparatus 900 is wirelessly connected to the mobile terminal 10, the user interface apparatus 200 may be wirelessly connected to the mobile terminal 10.

When it is determined that the mobile terminal 10 and the detachable interface apparatus 900 are tagged to be wirelessly connected, the processor 270 may acquire one or more information items from the mobile terminal 10 through the communication apparatus 400 or may provide various types of data and a control signal to the mobile terminal 10.

When the user interface apparatus 200 is wirelessly connected to the mobile terminal 10, the processor 270 may provide a control signal so that a remote control menu for controlling one or more devices provided in the vehicle 100 is output to the mobile terminal 10.

For example, the remote control menu may be a menu for remotely controlling every device provided in the vehicle 100.

For example, the remote control menu may be a menu screen which allows a user to control the air conditioner drive unit 660 of the vehicle 100, output various contents stored in the memory 140, and manipulate setting of a control mode of the vehicle 100 by using the mobile terminal 10.

When the detachable interface apparatus 900 wirelessly connected to the mobile terminal 10 is attached to a specific selected display, the processor 270 may perform a control action such that a control menu for a preset device corresponding to a type of the selected display unit 251 is output as the remote control menu to the mobile terminal 10.

For example, a preset device corresponding to the instrument panel 251*a* may include at least one of: the driving manipulation apparatus 500, a device included in the air conditioner drive unit 660 for discharging air toward a driver's seat; the navigation system 700; an output unit 250 disposed at the driver's seat; the input unit 210; the safety apparatus drive unit 640; or the door/window drive unit 630. In this case, the remote control menu may be a menu for controlling at least one of: the driving manipulation apparatus 500; the device included in the air conditioner drive unit 660 for discharging air toward a driver's seat; the navigation system 700; the output unit 250 disposed at the driver's seat; the input unit 210; the safety apparatus drive unit 640; or the door/window drive unit 630.

For example, a preset device corresponding to the front-passenger seat display 251*e* may include at least one of: the driving manipulation apparatus 500, a device included in the air conditioner drive unit 660 for discharging air toward the front-passenger seat; the navigation system 700; an output unit 250 disposed at the front-passenger seat; the input unit 210; the safety apparatus drive unit 640; or the door/window drive unit 630. In this case, the remote control menu may be at least one of: the driving manipulation apparatus 500, the device included in the air conditioner drive unit 660 for discharging air toward the front-passenger seat; the navigation system 700; the output unit 250 disposed at the front-passenger seat; the input unit 210; the safety apparatus drive unit 640; or the door/window drive unit 630.

For example, a preset device corresponding to the RSE 251*d* may include at least one of: the driving manipulation apparatus 500; a device included in the air conditioner drive unit 660 for discharging air toward a back seat; the navigation system 700; an output unit 250 disposed at the back seat; the input unit 210; the safety apparatus drive unit 640; or the door/window drive unit 630. In this case, the remote control menu may be a menu for controlling at least one of: the driving manipulation apparatus 500; the device included in the air conditioner drive unit 660 for discharging air toward a back seat; the navigation system 700; the output unit 250 disposed at the back seat; the input unit 210; the safety apparatus drive unit 640; or the door/window drive unit 630.

For example, a preset device corresponding to the CID 251*b* may include all devices provided in the vehicle 100. In this case, the remote control menu may be a menu for controlling at least one of all devices provided in the vehicle 100.

When the detachable interface apparatus 900 is separate from the plurality of display units 251, the processor 270 may determine the last display unit 251 to which the detachable interface apparatus 900 was attached most recently. The processor 270 may perform a control action such that a control menu corresponding to a type of the last display unit 251 to which the detachable interface apparatus 900 was attached most recently is output as a remote control menu to the mobile terminal 10. The control menu corresponding to the type of the last display unit 251 is a control menu for a preset device corresponding to the type of the last display unit 251.

According to an implementation, the interface system may include a plurality of mobile terminals 10.

The detachable interface apparatus 900 may be wirelessly connected to any mobile terminal 10 selected from the plurality of mobile terminals 10.

For example, the detachable interface apparatus 900 may be wirelessly connected to a mobile terminal 10 which request wireless connection from among the plurality of mobile terminals 10.

For example, the detachable interface apparatus 900 may be wirelessly connected to a mobile terminal 10 which is located within a preset distance from among the plurality of mobile terminals 10. The preset distance may be a distance required to perform Near Field communication (NFC) tagging.

The user interface apparatus 200 may be wirelessly connected to the plurality of mobile terminals 10. For example, the user interface apparatus 200 may be wirelessly connected to a mobile terminal 10 which request wireless connection from among the plurality of mobile terminals 10.

When the user interface apparatus 200 is wirelessly connected to the plurality of mobile terminals 10, the processor 270 may receive user inputs respectively transmitted by the plurality of mobile terminals 10.

The processor 270 may provide the user inputs, transmitted by the plurality of mobile terminals 10, to the controller 170 of the vehicle 100. Based on the user inputs transmitted by the plurality of mobile terminals 10, the controller 100 may control one or more devices provided in the vehicle 100. Accordingly, multiple users are able to control one or more devices provided in the vehicle 100 by using their own mobile terminals 10.

The processor 270 may determine that a user input transmitted from a mobile terminal which is wirelessly connected to the detachable interface apparatus 900 among a plurality of mobile terminals 10 connected to the user interface apparatus 200 is a first prioritized input.

The first prioritized input indicates an input which is first reflected in controlling a corresponding device among a plurality of received inputs. For example, when a plurality of user inputs regarding the air conditioner drive unit 660 is received, the processor 270 may control the air conditioner drive unit 660 based on a first prioritized input.

FIG. 9 is a diagram illustrating how a detachable interface apparatus according to an implementation becomes detached from a display unit.

The detachable interface apparatus 900 may be attached to any one of the plurality of display units 251 provided in the vehicle 100.

The detachable interface apparatus 900 may include an electromagnet module 980 at a rear side thereof. Each of the plurality of display units 251 provided in the vehicle 100 may have an electromagnet at a rear side of a corresponding display panel.

The processor 270 of the user interface apparatus 200 may control a magnetic force of the electromagnet module 980 of the detachable interface apparatus 900 and a magnetic force of an electromagnet provided in each display unit 251.

The processor 270 may control at least one of the magnetic force of the electromagnet module 980 or the magnetic force of the electromagnet provided in each display unit 251, so that attraction occurs between the electromagnet module 980 of the detachable interface apparatus 900 and the electromagnet provided in each display unit 251.

When an attractive force occurs between the electromagnet module 980 of the detachable interface apparatus 900 and an electromagnet provided in a specific display unit 251, the detachable interface apparatus 900 may be attached to the specific display unit 251.

Figure 9A:
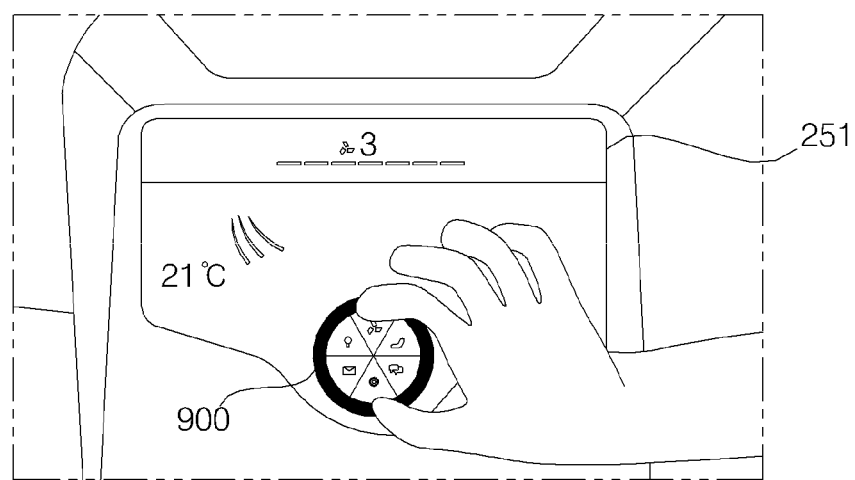
FIGS. 9A-C are diagrams illustrating an example of a detachable interface apparatus becoming detached from a display unit of a vehicle according to an implementation.

Referring to the example of FIG. 9A, the detachable interface apparatus 900 may be attached to the CID 251b.

In addition, the detachable interface apparatus 900 may be attached to any one selected from the instrument panel 251a, the RSE 251d, the front-passenger seat display 251e, and the side mirror display 251s.

Figure 9B:
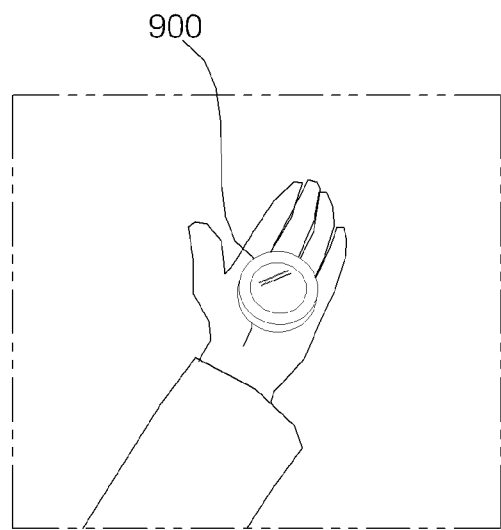

Referring to the example of FIG. 9B, the detachable interface apparatus 900 may be detached from any of the plurality of display units 251.

The detachable interface apparatus 900 may be wirelessly connected to the user interface apparatus 200 to communicate therewith.

Figure 9C:
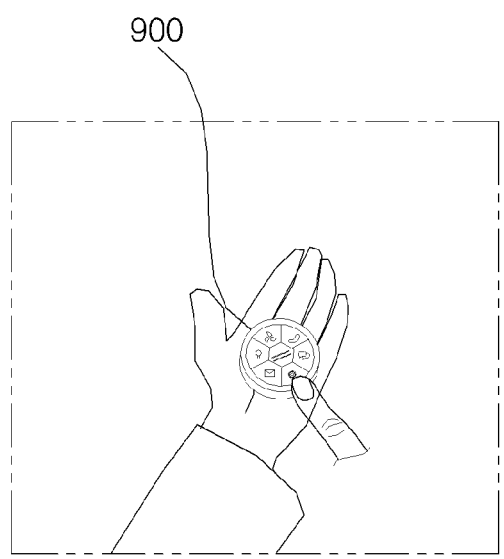

Referring to the example of FIG. 9C, when the detachable interface apparatus 900 is detached from a display unit 251, a menu for controlling one or more devices provided in the vehicle 100 (hereinafter, referred to as a remote control menu) may be output to the detachable interface apparatus 900.

The processor 270 of the user interface apparatus 200 may determine whether the detachable interface apparatus 900 becomes detached from any of the plurality of display units 251.

When it is determined that the detachable interface apparatus 900 becomes detached from any of the plurality of display units 251, the processor 270 may provide a control signal to the detachable interface apparatus 900 so that the remote control menu is output to the detachable interface apparatus 900. The processor 270 may provide the control signal to the detachable interface apparatus 900 through the communication apparatus 400.

The control module 970 of the detachable interface apparatus 900 may output the remote control menu to a touch screen 915 based on the control signal received through the communication module 940.

The control module 970 may transmit a user input, received on the remote control menu, to the user interface apparatus 200.

The user interface apparatus 200 may control one or more devices provided in the vehicle 100, based on the user input provided by the user interface apparatus 200. Accordingly, a user is able to control the vehicle 100 using the detachable interface apparatus 900 which is separate from the plurality of display units 251.

In the case where the detachable interface apparatus 900 is attached to a selected display unit 251, the processor 270 may determine a type of the selected display unit 251 to which the detachable interface apparatus 900 becomes attached. For example, the type of the selected display unit 251 may be the instrument panel 251a, the Cid 251B, the RSE 251d, the front-passenger seat display 251e, and the side mirror display 251s.

Figure 10:
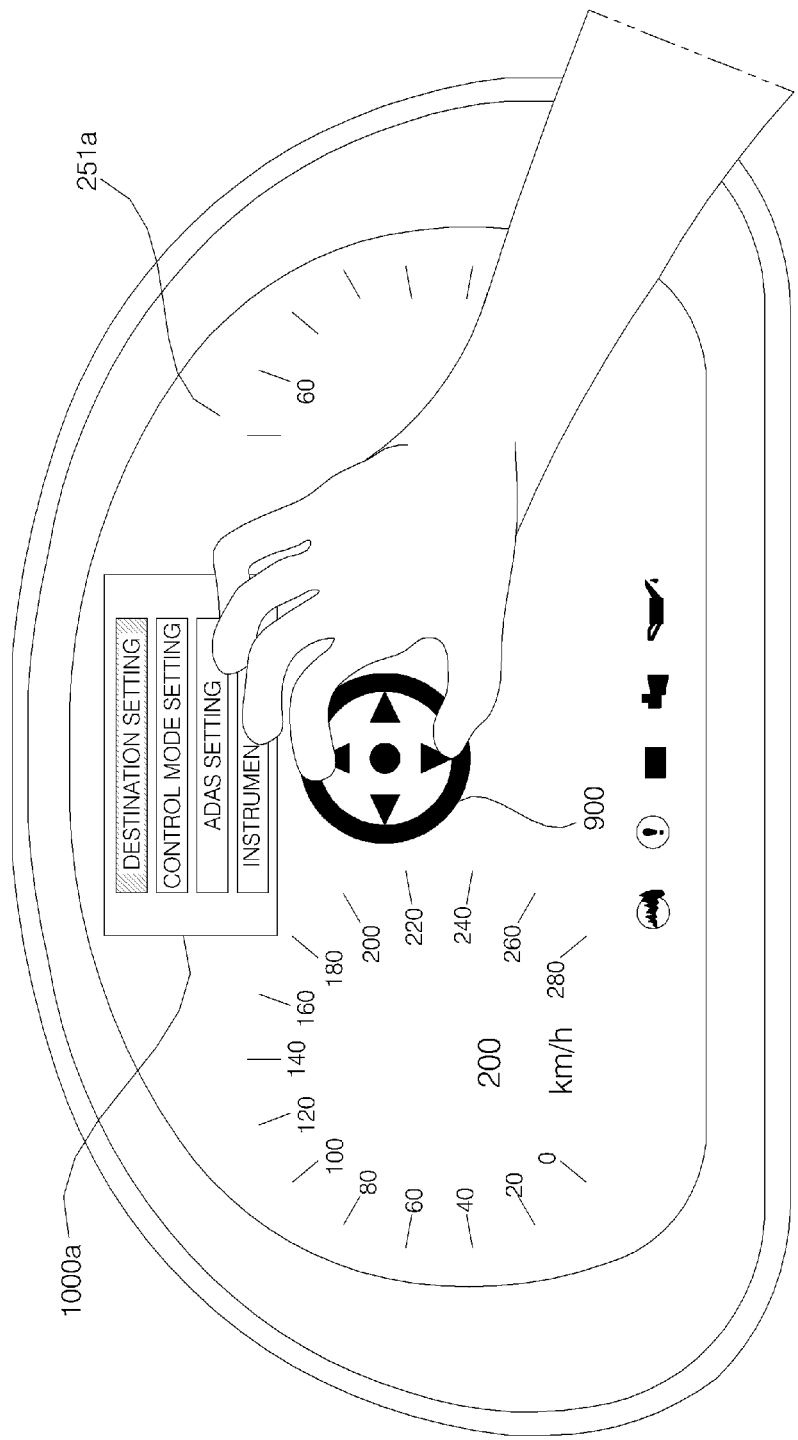
FIG. 10 is a diagram illustrating an example of a detachable interface apparatus attached to an instrument panel of a vehicle according to an implementation.

FIG. 10 is a diagram illustrating an example in which a detachable interface apparatus to an implementation becomes attached to an instrument panel.

In the case where the detachable interface apparatus 900 becomes attached to the instrument panel 251a of the vehicle 100, the processor 270 may determine, based on the detachable interface apparatus 900, that a type of a selected display unit 251 to which the detachable interface apparatus 900 becomes attached is the instrument panel 251a.

When it is determined that the type of the display panel to which the detachable interface apparatus 900 becomes attached is the instrument panel 251a, the processor 270 may output a preset driver menu 100a to the instrument panel 251a.

The driver menu 100a is a menu screen for controlling various functions necessary for a driver.

Information about the driver menu 100a may be stored in the memory 140 of the vehicle 100 or an additional memory provided in the processor 270.

For example, the preset driver menu 100a may include buttons for destination setting, control mode setting, ADAS setting, and instrument panel setting.

When a button for destination setting is selected, the processor 270 may output, to the instrument panel 251a, a destination input window to set a destination of the vehicle 100.

Based on a user input into the destination input window, the processor 270 may set a destination of the vehicle 100 and generate various routes to the set destination.

When a button for control mode setting is selected, the processor 270 may output, to the instrument panel 251a, a control mode selection window to set a control mode of the vehicle 100.

Based on a user input into the control mode selection window, the processor 270 may set any one mode selected from among the manual mode, the autonomous mode, and the remote control mode as the control mode of the vehicle 100.

When a button for ADAS setting is selected, the processor 270 may output, to the instrument panel 251a, an ADAS setting window to set various ADAS functions of the vehicle 100. The processor 270 may display various ADAS functions of the vehicle 100 on the ADAS setting window.

Based on a user input into the ADAS setting window, the processor 270 may selectively activate or deactivate any one of the various ADAS functions of the vehicle.

When a button for instrument panel setting is selected, the processor 270 may output, to the instrument panel 251a, a screen setting window to set a screen of the instrument panel 251a. The processor 270 may display, on the screen setting window, a menu for setting brightness, style, and color of the instrument panel 251a.

Based on a user input into the screen setting window, the processor 270 may change the brightness, the style, or the color of the instrument panel 251a.

The processor 270 may provide a control signal so that a graphic object for manipulating the driver menu 1000a is displayed on the touch screen 915 of the detachable interface apparatus 900.

For example, the graphic object for manipulating the driver menu 1000a may include arrows indicating the top, down, right, and left direction, and a selection button.

Based on a received control signal, the control module 970 of the detachable interface apparatus 900 may display the graphic object for manipulating the driver menu 100*a*. The control module 970 of the detachable interface apparatus 900 may provide a user input on the graphic object to the user interface apparatus 200.

Based on the user input received from the detachable interface apparatus 900, the processor 270 may perform a function included in the driver menu 1000*a*.

Figure 11:
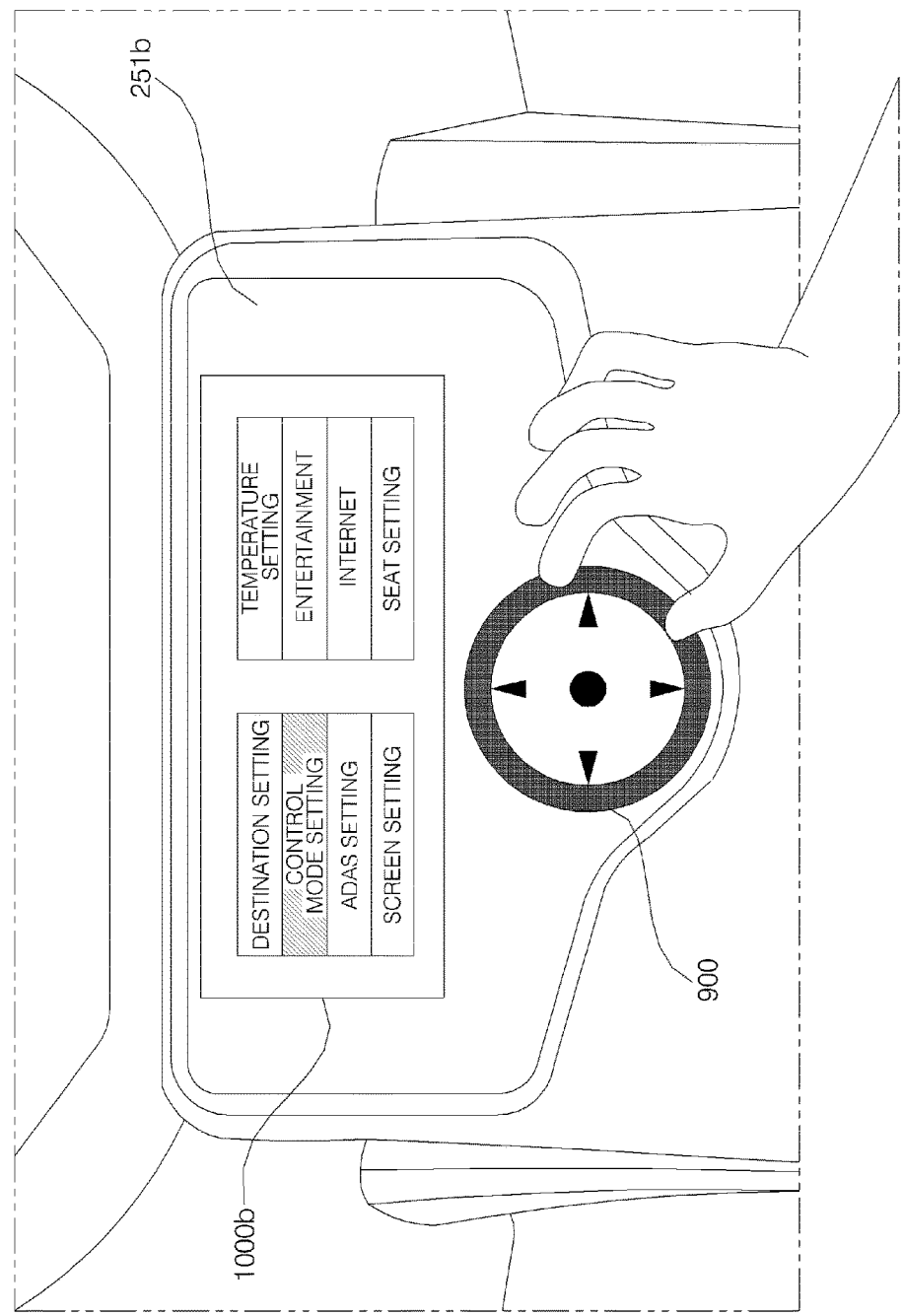
FIG. 11 is a diagram illustrating an example of a detachable interface apparatus attached to a Center Information Display (CID) of a vehicle according to an implementation.

FIG. 11 is a diagram illustrating how a detachable interface apparatus according to an implementation becomes attached to a CID.

In the case where the detachable interface apparatus 900 is attached to the CID 251*b* of the vehicle 100, the processor 270 may determine, based on magnetic force variation sensed from the CID 251*b*, that a type of a display unit 251 to which the detachable interface apparatus 900 is attached is the CID 251*b*.

When it is determined that the type of the display unit 251 to which the detachable interface apparatus 900 is attached is the CID 251*b*, the processor 270 may output a preset front-passenger seat menu 100*b* to the CID 251*b*.

The front-passenger seat menu 1000*b* is a menu screen for controlling various functions necessary for a person sitting in the front-passenger seat.

Information about the front-passenger seat menu 1000*b* may be stored in the memory 140 of the vehicle 100 or an additional memory provided in the processor 270.

For example, the preset front-passenger seat menu 1000*b* may include buttons for destination setting, control mode setting, ADAS setting, screen setting, temperature setting, entertainment, the Internet, and seat setting.

When a button for destination setting is selected, the processor 270 may output, to the CID 251*b*, a destination input window to set a destination of the vehicle 100.

Based on a user input into the destination input window, the processor 270 may set a destination of the vehicle 100 and generate various routes to the set destination.

When a button for control mode setting is selected, the processor 270 may output, to the CID 251*b*, a control mode selection window to set a control mode of the vehicle 100.

Based on a user input into the control mode selection window, the processor 270 may set any one selected from the manual mode, the autonomous mode, and the remote control mode as a control mode of the vehicle 100.

When a button for ADAS setting is selected, the processor 270 may output, to the CID 251*b*, an ADAS setting window to set various ADAS functions of the vehicle 100. The processor 270 may display the various ADAs functions of the vehicle 100 on the ADAS setting window.

Based on a user input into the ADAS setting window, the processor 270 may selectively activate or deactivate any one of the various ADAs functions of the vehicle 100.

When a button for screen setting of the CID 251*b* is selected, the processor 270 may output, to the CID 251*b*, a screen setting window to set the screen of the CID 251*b*. The processor 270 may display, on the screen setting window, a menu for setting brightness, style, and color of the CID 251*b*.

Based on a user input into the screen setting window, the processor 270 may change the brightness, the style, or the color of the CID 251*b*.

When a button for temperature setting is selected, the processor 270 may output, to the CID 251*b*, a temperature setting window to set inner temperature of the vehicle 100. The processor 270 may display, on the temperature setting window, a menu item for controlling the air conditioner drive unit 660 and a menu item for controlling a hot wire of each seat.

Based on a user input into the temperature setting window, the processor 270 may control at least one of the air conditioner drive unit 660 or a seat hot wire.

When a button for entertainment is selected, the processor 270 may output, to the CID 251*b*, a content selection window to select various contents (for example, a video, music, game, etc.) stored in the memory 140 or available on the Web.

Based on a user input into the content selection window, the processor 270 may output a selected content to the CID 251*b*.

When a button for the Internet is selected, the processor 270 may output a web browser window to the CID 251*b*.

When a button for seat setting is selected, the processor 270 may output, the CID 251*b*, a seat setting window to set a position of a seat.

The processor 270 may control the position of the seat based on a user input into the seat setting window.

The processor 270 may provide a control signal so that a graphic object for manipulating the front-passenger seat menu 1000*b* is displayed on the touch screen 915 of the detachable interface apparatus 900.

For example, the graphic object for manipulating the front-passenger seat menu 1000*b* may include arrows indicating the top, down, right, and left directions, and a selection button.

Based on a received control signal, the control module 970 of the detachable interface apparatus 900 may display the graphic object for manipulating the front-passenger seat menu 1000*b*. The control module 970 of the detachable interface apparatus 900 may provide the user interface apparatus 200 with a user input on the graphic object.

Based on the user input received from the detachable interface apparatus 900, the processor 270 may perform a function included in the front-passenger seat menu 1000*b*.

Figure 12:
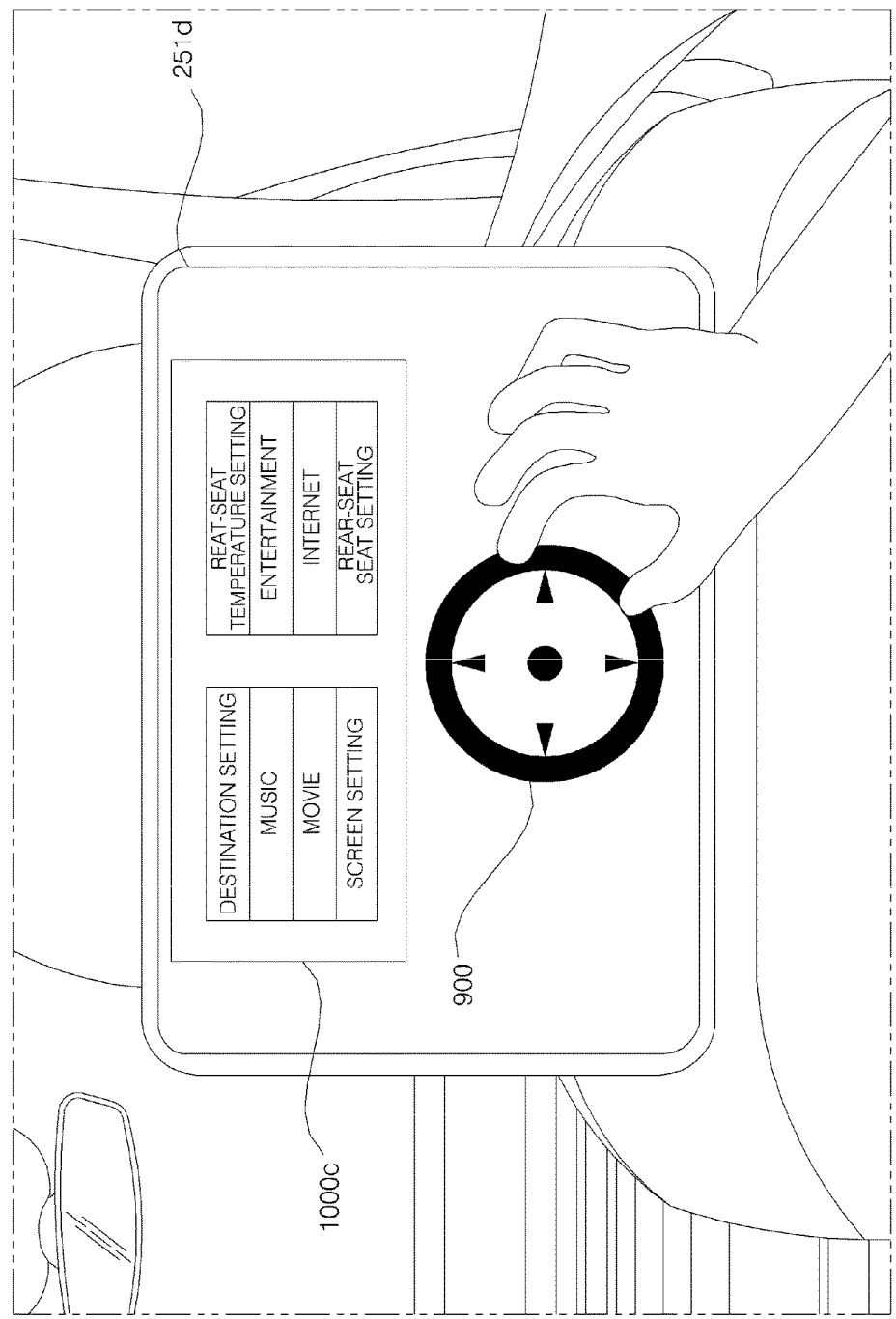
FIG. 12 is a diagram illustrating an example of a detachable interface apparatus attached to a Rear Seat Entertainment (RSE) of a vehicle according to an implementation.

FIG. 12 is a diagram illustrating an example in which a detachable interface apparatus according to an implementation is attached to an RSE.

In the case where the detachable interface apparatus 900 becomes attached to the RSE 251*d* of the vehicle 100, the processor 270 may determine, based on a magnetic force variation sensed from the RSE 251*d*, that a type of a display unit 251 to which the detachable interface apparatus 900 is attached is the RSE 251*d*.

When it is determined that the type of the display unit 251 to which the detachable interface apparatus 900 is attached is the RSE 251*d*, the processor 270 may output a preset rear-passenger seat menu 1000*c* to the RSE 251*d*.

The rear-passenger seat menu 1000*c* is a menu screen for controlling various functions necessary for a person sitting in a rear seat.

Information about the rear-passenger seat menu 1000*c* may be stored in the memory 140 of the vehicle 100 or an additional memory provided in the processor 270.

For example, the preset rear-passenger seat menu 1000*c* may include buttons for destination setting, music, movie, screen setting, rear-seat temperature setting, entertainment, the Internet, and rear-passenger seat setting.

When a button for destination setting is selected, the processor 270 may output, to the RSE 251*d*, a destination input window to set a destination of the vehicle 100.

Based on a user input into the destination input window, the processor 270 may set a destination of the vehicle 100 and generate various routes to the set destination.

When a button for music is selected, the processor 270 may output, to the RSE 251*d*, a music file list stored in the memory 140 of the vehicle 100 or an additional memory provided in the processor 270.

Using the sound output unit 251, the processor 270 may play a music file selected by a user input from among the music file list.

When a button for movie is selected, the processor 270 may output, to the RSE 251*d*, a movie file list stored in the memory 140 of the vehicle or an additional memory provided in the processor 270.

Using the sound output unit 252 and the RSE 251*d*, the processor 270 may output a movie selected by a user input from among the movie file list.

When a button for screen setting of the RSE 251*d* is selected, the processor 270 may output, to the RSE 251*d*, a screen setting window to set the screen of the RSE 251*d*. The processor 270 may display, on the screen setting window, a menu for setting brightness, style, and color of the screen.

The processor 270 may change the brightness, the style, and the color of the screen of the RSE 251*d*, based on a user input into the screen setting window.

When a button for rear-seat temperature setting is selected, the processor 270 may output, to the RSE 251*d*, a temperature setting window to set temperature of a rear seat. In the temperature setting window, the processor 270 may display a menu item for controlling the air conditioner drive unit 660 which discharges air toward the rear seat, and a menu item for controlling a rear-seat hot wire.

The processor 270 may adjust temperature of the rear seat, by controlling, based on a user input into the temperature setting window, at least one of the air conditioner drive unit 660 for discharging air toward the rear seat and the rear-seat hot wire.

When a button for entertainment is selected, the processor 270 may output, to the RSE 251*d*, a content selection window to select any of various contents (for example, a video, music, a game, etc.) stored in the memory 140 of the vehicle or available on the web.

The processor 270 may output, to the RSE 251*d*, a content selected based on a user input into the content selection window.

When a button for the Internet is selected, the processor 270 may output a web browser window to the RSE 251*d*.

When a button for rear seat setting, the processor 270 may output, to the RSE 251*d*, a seat setting window to set a position of a rear seat of the vehicle 100.

The processor 270 may control the position of a rear seat based on a user input into the seat setting window.

The processor 270 may provide a control signal so that a graphic object for manipulating the rear-passenger seat menu 1000*c* is displayed on the touch screen 915 of the detachable interface apparatus 900.

For example, the graphic object for manipulating the rear-passenger seat menu 1000*c* may include arrows indicating the top, down, right, and left directions and a selection button.

Based on a received control button, the control module 970 of the detachable interface apparatus 900 may display a graphic object for manipulating the rear-passenger seat menu 1000*c*. The control module 970 of the detachable interface apparatus 900 may provide the user interface apparatus 200 with a user input on the graphic object.

Based on the user input received from the detachable interface apparatus 900 may perform a function included in the rear-passenger seat menu 1000*c*.

FIG. 13 is a diagram illustrating a remote control menu which is output to a detachable interface apparatus according to an implementation.

The processor 270 of the user interface apparatus 200 may determine whether the detachable interface apparatus 900 is separate from a plurality of display units 251.

When it is determined that the detachable interface apparatus 900 is separate from the plurality of display units 251, the processor 270 may provide a control signal so that a remote control menu (hereinafter, referred to as a first menu) for controlling one or more devices provided in the vehicle 100 is output to the detachable interface apparatus 900.

For example, one or more devices provided in the vehicle 100 may be the vehicle drive apparatus 600, the user interface apparatus 200, and the navigation system 770.

The first menu is a menu for remotely controlling one or more devices provided in the vehicle 100 by using the detachable interface apparatus 900.

For example, the processor 270 may set the first menu to include buttons for destination setting, driving setting, inner temperature setting, entertainment, and lighting setting.

Based on a control signal provided by the processor 270, the detachable interface apparatus 900 may output the first menu to the display module 950.

The detachable interface apparatus 900 may transmit a user input received on the first menu to the communication apparatus 400. Through the communication apparatus 400, the processor 270 may acquire the user input received on the first menu.

The processor 270 may control one or more devices provided in the vehicle 100, based on the acquired user input received on the first menu.

For example, when the user input received on the first menu is to select destination setting, the processor 270 may provide a control signal so that a destination input window for setting a destination of the vehicle 100 is output to the detachable interface apparatus 900.

The control module 970 of the detachable interface apparatus 900 outputs a destination input window to the display module 950 based on the control signal. The control module 970 transmits a user input into the destination input window to the communication apparatus 400.

The processor 270 may set a destination of the vehicle 100 based on the user input acquired through the communication apparatus 400.

For example, when the user input received on the first menu is to select driving setting, the processor 270 may provide a control signal so that a driving function setting window for setting a driving-related function is output to the detachable interface apparatus 900. For example, the driving function setting window may include a menu about at least one of: setting of an ADAS function; setting of a driving mode (which includes, for example, a sport mode, an ECO mode, a safe mode); and setting of a control mode (which includes, for example, a manual mode, an autonomous mode, and a remote control mode).

The control module 970 of the detachable interface apparatus 900 may output the driving function setting window to the display module 950 based on a control signal. The control module 970 may transmit a user input into the driving function setting window to the communication apparatus 400.

The processor 270 may set any of various driving functions, by providing the vehicle drive apparatus 600 with a control signal based on a user input acquired through the communication apparatus 400.

For example, when it is determined that the user input received on the first menu is to select inner temperature setting, the processor 270 may provide a control signal so that a temperature input window for setting inner temperature of the vehicle 100 is output to the detachable interface apparatus 900.

The control module 970 of the detachable interface apparatus 900 may output a temperature input window to the display module 950 based on the control signal. The control module 970 may transmit the user input into the temperature input window to the communication apparatus 400.

The processor 270 may set inner temperature of the vehicle 100 based on the user input acquired through the communication apparatus 400. The processor 270 may control the air conditioner drive unit 660 based on the set inner temperature For example, when it is determined that the user input received on the first menu is to select entertainment, the processor 270 may provide a control signal so that a content selection window for selecting one of contents stored in the memory 140 is output to the detachable interface apparatus 900.

The control module 970 of the detachable interface apparatus 900 may output a content selection window to the display module 950 based on the control signal. The control module 970 may transmit a user input into the content selection window to the communication apparatus 400.

The processor 270 may output a selected content to the output unit 250 based on the user input acquired through the communication apparatus.

For example, when it is determined that the user input received on the first menu is to select lighting setting, the processor 270 may provide a control signal so that a lighting setting window for setting lighting inside the vehicle 100 is output to the detachable interface apparatus 900.

The control module 970 of the detachable interface apparatus 900 may output a lighting setting window to the display module 950 based on the control signal. The control module 970 may transmit a user input into the lighting setting window to the communication apparatus 400.

The processor 270 may control a lighting device of the vehicle 100 based on the user input acquired through the communication apparatus 400.

According to another implementation, in the case where it is determined that the detachable interface apparatus 900 is separate from the plurality of display units 251, the processor 270 may output, to the detachable interface apparatus 900, a first menu which corresponding to a type of the last display unit 251 to which the detachable interface apparatus 900 was attached most recently.

The first menu corresponding to the type of the display unit 251 to which the detachable interface apparatus 900 was attached most recently is a remote control menu for controlling a preset device which corresponds to the type of the last display unit 251. For example, a preset device corresponding to the RSE 251d may be a device disposed at a rear seat, and, in this case, the first menu may include various buttons for controlling the device disposed at the rear seat.

Figure 14A:
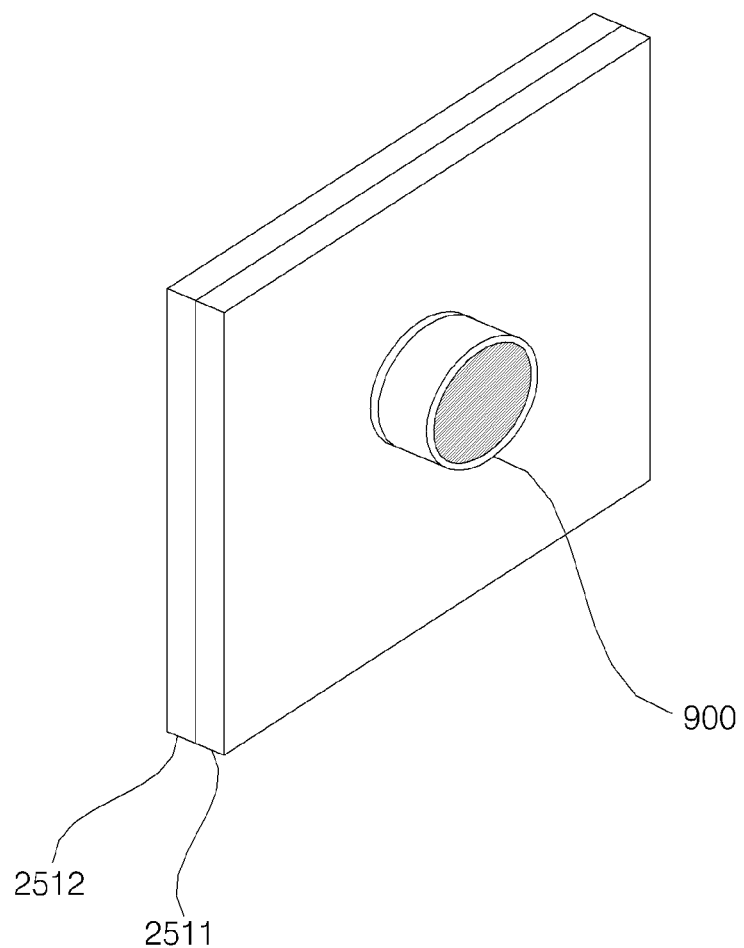
FIGS. 14A, 14B, 14C, and 14D are diagrams illustrating examples in which a detachable interface apparatus is attached to a display unit of a vehicle according to an implementation.
Figure 14B:
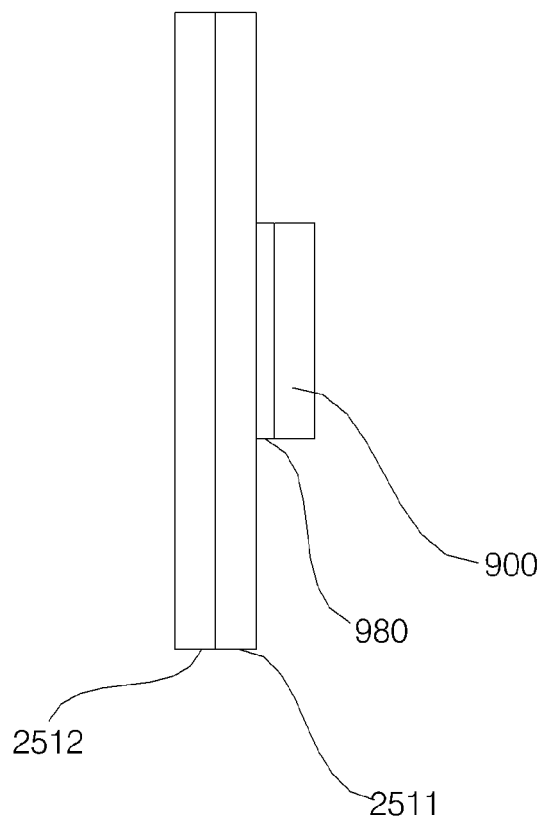

FIGS. 14A an 14B are diagrams illustrating an example in which a detachable interface apparatus according to an implementation is attached to a display unit.

Referring to FIG. 14A, a plurality of display units 251 provided in the vehicle 100 may each include a display panel 2511 and a magnet 2512.

The magnet 2512 may be an electromagnet panel or a permanent magnet panel. the magnet 2512 may be disposed on the rear surface of the display panel 2511. The magnet 2512 may be implemented as a panel which is disposed on the rear surface of the display panel 2511.

When the magnet 2512 is an electromagnet panel, the processor 270 may control a magnetic force of the electromagnet panel. In the example of FIG. 14A, it is assumed that the magnet 2512 is an electromagnet panel.

The detachable interface apparatus 900 includes the electromagnet module 980 disposed on the rear surface thereof.

The electromagnet module 980 may be controlled by the processor 270 of the user interface apparatus 200 or the control module 970 of the detachable interface apparatus 900.

The electromagnet module 980 may be an electromagnet having a variable magnetic force. The magnetic force of the electromagnet module 980 may be varied by the control of the processor 270 or the control module 970. In contrast, the electromagnet module 980 may be a permanent magnet having a fixed magnetism.

When a magnetic force is created by the electromagnet module 980, it may cause an attractive or repulsive force to occur between the electromagnet module 980 and a metal material or any material having a magnetic force.

When an attractive force occurs between the magnet 2512 disposed on the rear surface of the display panel 2511 and the electromagnet module 980 of the detachable interface apparatus 900, the detachable interface apparatus 900 may become attached to the front surface of the display panel 2511.

The processor 270 may adjust a magnetic force of either or both of the electromagnet panel 2512 and the electromagnet module 980 so as to cause an attractive force to occur between the electromagnet panel 2512 and the electromagnet module 980 of the detachable interface apparatus 900.

The processor 270 may adjust a magnetic force of the electromagnet module 980 by providing a control signal to the detachable interface apparatus 900.

The processor 270 may adjust a magnetic force of the electromagnet by providing the electromagnet panel 2512.

Accordingly, the processor 270 may allow the detachable interface apparatus 900 to be attached to one region on the plurality of display units 251.

Unlike the example of FIG. 14A, a plurality of magnets may be disposed on the rear surface of the display panel 2511.

In addition, a magnet may be disposed on one region of the rear surface of the display panel 211. In this case, the detachable interface apparatus 900 may be attached to a region where the magnet is disposed in the entire rear surface of the display panel 2511.

Unlike the example of FIG. 14A, the electromagnet module 980 may be a permanent magnet.

Figure 14C:
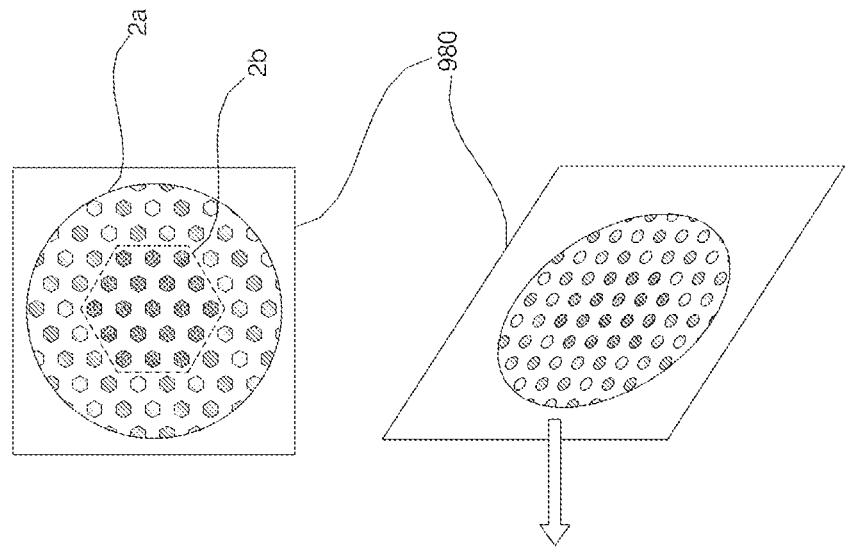
Figure 14D:
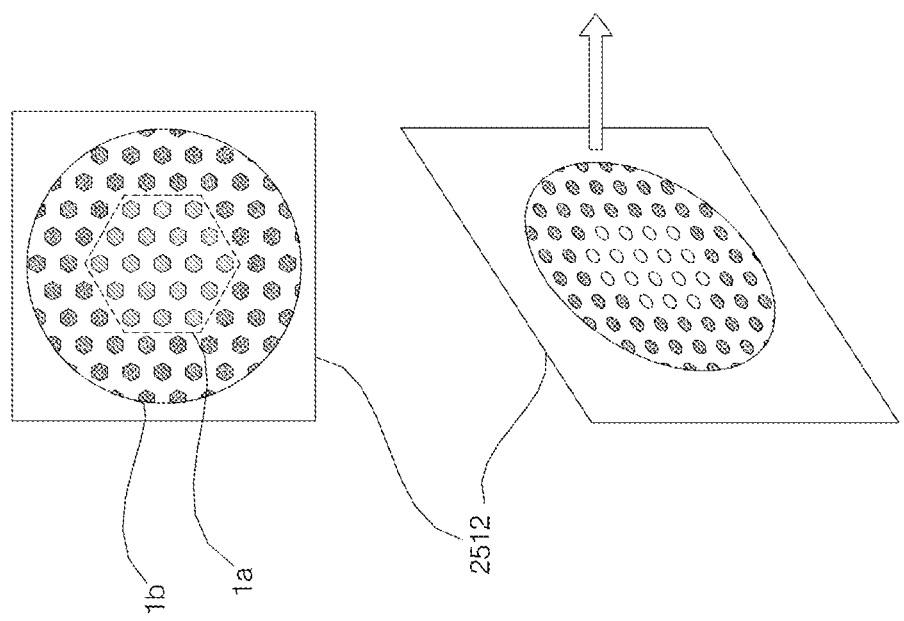

Referring to FIGS. 14C and 14D, the processor 270 of the user interface apparatus 200 may form a plurality of magnetic pixels in the magnet 2512 of the display unit 251 and the electromagnet module 980 of the detachable interface apparatus 900.

A magnetic pixel is a magnetic pole formed in one region of the magnet 2512 or the electromagnet module 980. One magnetic pixel may be have N- or S-polarity.

For example, the processor 270 may control the magnet 2512 so that N-polarity magnetic poles are arranged in a first region of the magnet 2512. The processor 270 may control the magnet 2512 so that S-polarity magnetic poles are arranged in a second region 1b. The processor 270 may control the electromagnet module 980 so that S-polarity magnetic pixels are arranged in a second region 2a of the electromagnet module 980, which corresponds to the first region 1a of the magnet 2512. The processor 270 may control the electromagnet module 980 so that N-polarity magnetic poles are arranged in a second region 2b of the electromagnet module 980, which corresponds to the second region 1b of the magnet 2512. Accordingly, an attractive force is generated between the first region 1a of the magnet 2512 and the first region 2a of the electromagnet module 980 and between the second region 1b of the magnet 2512 and the second region 2b of the electromagnet module 980, and therefore, an attractive force occurs between the magnet 2512 and the electromagnet module 980.

In the present disclosure, it is defined such that magnetic pixels of different polarities correspond to each other.

By disposing magnetic pixels corresponding to each other in the magnet 2512 and the electromagnet module 980, the processor 270 may cause an attractive force to occur between the magnet 2512 and the electromagnet module 980. By adjusting the number of magnetic pixels corresponding to each other, the processor 270 may adjust a force of adhesion between the detachable interface apparatus 900 and a selected display unit 251. In this case, the number of magnetic pixels corresponding to each other is proportional to the force of adhesion between the detachable interface apparatus 900 and the selected display unit 251.

FIG. 15 is a diagram illustrating an example in which a detachable interface apparatus provided in a mobile terminal becomes attached to a display unit, according to an implementation.

In one implementation, the detachable interface apparatus 900 may be provided in a mobile terminal 10. In this case, the detachable interface apparatus 900 may be detached from the mobile terminal 10.

In the case where the detachable interface apparatus 900 is provided in the mobile terminal 10, the mobile terminal is wirelessly connected to the detachable interface apparatus 900 to control the detachable interface apparatus 900.

In the case where the detachable interface apparatus 900 becomes attached to the mobile terminal 10, the mobile terminal 10 utilizes the touch screen 915 of the detachable interface apparatus 900 as an input device and a display device. Accordingly, in the case when the detachable interface apparatus 900 is attached to the mobile terminal 10, the touch screen 915 of the detachable interface apparatus 900 may operate as an input/output device of the mobile terminal 10.

For example, when the mobile terminal is a watch type, buttons related to time, weather, and setting of the mobile terminal 10 may be displayed in the detachable interface apparatus 900 which is attached to the mobile terminal.

In the case where the detachable interface apparatus 900 is separate from the mobile terminal 10, the mobile terminal 10 may output, to the touch screen 915 of the detachable interface apparatus 900, a text indicating the separation of the detachable interface apparatus 900.

When the detachable interface apparatus 900 becomes attached to a selected display unit 251 provided in the vehicle 100, the user interface apparatus 200 may be wirelessly connected to the mobile terminal 10 which is wirelessly connected to the detachable interface apparatus 900. When the detachable interface apparatus 900 becomes attached to the selected display unit 251, the processor 270 of the user interface apparatus 200 may request wireless connection from the mobile terminal 10 which is wirelessly connected to the detachable interface apparatus 900. When the mobile terminal 10 receives a user input intended to accept the request, the user interface apparatus 200 and the mobile terminal 10 may be wirelessly connected.

Through the communication apparatus 400, the processor 270 may acquire one or more information stored in the mobile terminal 10 or acquired by the mobile terminal 10.

Based on either or both of the information acquired from the mobile terminal 10 and a type of the selected display unit 251 to which the detachable interface apparatus is attached (hereinafter, referred to as the selected display unit 251), The processor 270 may output a user menu to the selected display unit 251.

Based on user-related information out of the information acquired from the mobile terminal 10, the processor 270 may determine a user menu which will be displayed on the selected display unit 251.

For example, when there is a preset menu screen (hereinafter, referred to as a user customized menu) set by a user based on user-related information (hereinafter, referred to as user information), the processor 270 may output a user customized menu 1000d on the selected display unit 251.

For example, the processor 270 may display, on the user customized menu 1000d, a user's personal information (for example, information about the user's name, age, gender, and occupation) determined based on the user information.

For example, the processor 270 may output a menu screen, set by a user based on user information, as the user customized menu 1000d.

For example, the user customized menu 1000d may include a function of setting a preset home address as a destination of the vehicle 100, a function of playing a music file list preset by the user, a function of setting temperature set by the user as inner temperature of the vehicle 100, and a function of making an emergency call to a phone number preset by the user.

The input module 910 of the detachable interface apparatus 900 may be implemented in any of various forms. For example, the input module 910 may be implemented in the form of a dial, a mechanical button, or the touch screen 915.

For example, the input module 910 of the detachable interface apparatus 900 may be in the form of a rotating dial. In this case, the edge portion of a detachable interface may rotate. When the input module 910 is implemented as a dial, an input of rotating the dial in a clockwise direction may correspond to a right direction, whereas an input of rotating the dial in a counter clockwise direction may correspond to a left direction.

Figure 16:
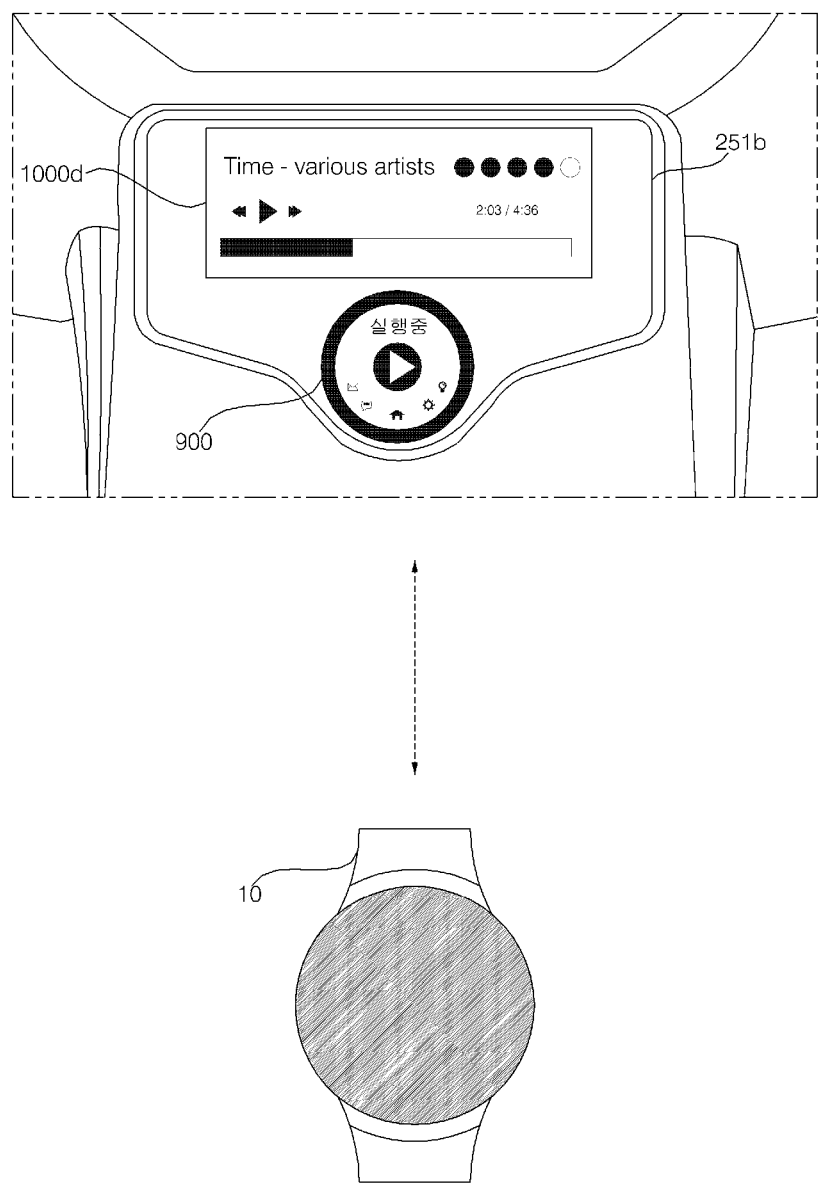
FIG. 16 is a diagram illustrating an example in which an application program that is executed on a mobile terminal is output to an output unit of a vehicle, according to an implementation.

FIG. 16 is a diagram illustrating an example in which an application of a mobile terminal is output to an output unit of a vehicle, according to an implementation.

When the mobile terminal 10 and the user interface apparatus 200 are wirelessly connected, the processor 270 may output, to the output unit 250, a screen 100d and sound of an application which is being executed in the mobile terminal 10.

For example, when the detachable interface apparatus 900 is provided in the vehicle 100, the processor 270 may acquire application-related information from the mobile terminal 10 which is wirelessly connected to the detachable interface apparatus 900. Based on the application-related information, the processor 270 may output, to the output unit 250 of the vehicle 100, the screen 1000d and sound of an application which is being executed in the mobile terminal 10.

For example, when the detachable interface apparatus 900 is provided in the mobile terminal 10 and is attached to a selected display unit 251, the detachable interface apparatus 900 may acquire application-related information from the mobile terminal 10. Based on the application-related information, the processor 270 may output, to the output unit 250 of the vehicle 100, the screen 100d and sound of an application which is being executed in the mobile terminal 10.

Based on the application-related information acquired from the mobile terminal 10, the processor 270 may determine which application is being executed in the mobile terminal 10.

For example, when a music application is being executed in the mobile terminal 10, the processor 270 may determine, based on application-related information acquired from the mobile terminal 10, that the music application is being executed in the mobile terminal.

The processor 270 may output, to the selected display unit 251 of the vehicle 100, the screen 1000d of an application which is being executed in the mobile terminal 10. In this case, the processor 270 may perform a mirroring or casting operation so as to output a screen of the mobile terminal 100, where the screen 1000d of the application is displayed, to the selected display unit 251.

For example, when it is determined that a music application is being executed in the mobile terminal 10, the processor 270 may output the screen 1000d of the music application to the selected display unit 251 of the vehicle 100. In this case, the processor 270 may display the same screen of the mobile terminal 10 or may display a different screen by reconfiguring a title of music being played, user preference, playback time, a manipulation key for the application, etc.

The processor 270 may output, to the sound output unit 252, sound of an application which is being executed in the mobile terminal 10.

The processor 270 may output, to the detachable interface apparatus 10, a menu for manipulating an application being executed in the mobile terminal 10 (hereinafter, referred to as an application menu). For example, the processor 270 may provide a control signal to the detachable interface apparatus 900, so that an application menu of a music application being executed in the mobile terminal 10 is output to the touch screen 915 of the detachable interface apparatus 900.

The application menu may include a button for manipulating an application being executed in the mobile terminal 10, and a button for executing one or more applications stored in the mobile terminal 10.

The control module 970 of the detachable interface apparatus 900 may output an application menu to the touch screen 915 based on a control signal. The control module 970 may transmit a user input corresponding to the application menu to the mobile terminal 10. The mobile terminal 10 may control an application based on the user input acquired through the detachable interface apparatus 900.

FIG. 17 is a diagram illustrating an example in which a user interface apparatus outputs an alarm corresponding to significant information through a mobile terminal.

When it is determined, based on information acquired through an interface unit, that there is significant information needed to be recognized by a user, the processor 270 of the user interface apparatus 200 may transmit, to the mobile terminal 10, a signal for outputting an alarm corresponding to the significant information.

Based on a type of the selected display unit 251, the processor 270 may determine whether there is significant information.

For example, the type of the selected display unit 251 may be the CID 251b, the RSE 251d, the instrument panel 251a, the front-passenger seat display 251e, and the side mirror display 251s.

The significant information is information about a preset situation corresponding the type of the selected display unit 251.

For example, a preset situation corresponding to the instrument panel 251a includes at least one of: a situation where an object whose probability of collision with the vehicle 100 is equal to or greater than a reference value; a situation where there is a traffic law possibly to be violated by the vehicle 100; and a situation where there is a traffic sign indicating a destination of the vehicle 100.

When it is determined that the detachable interface apparatus 900 is attached to the instrument panel 251a, the processor 270 may determine whether there is a preset situation corresponding to the instrument panel 251a. When it is determined that the detachable interface apparatus 900 is attached to the instrument panel 251a and that there is a preset situation corresponding to the instrument panel 251a, the processor 270 may determine there is significant information. In this case, the processor 270 may provide a control signal so that an alarm for notifying the preset situation corresponding to the instrument panel 251a is output to the mobile terminal 10.

For example, a preset situation corresponding to the RSE 251d or the front-passenger seat display 251e is situation where there is an object whose probability of collision with the vehicle 100 is equal to or greater than a reference value.

When it is determined that the detachable interface apparatus 900 is attached to the RSE 251d or the front-passenger seat display 251e, the processor 270 may determine, based on surrounding situation information, that there is a preset situation corresponding to the RSE 251d or the front-passenger seat display 251e. When it is determined that the detachable interface apparatus 900 is attached to the RSE 251d or the front-passenger seat display 251e and that there is an object whose probability of collision with the vehicle 100 is equal to or greater than the reference value, the processor 270 may determine that there is significant information. In this case, the processor 270 may provide a control signal so that an alarm for notifying the presence of the object whose probability of collision with the vehicle 100 is equal to or greater than the reference value is output to the mobile terminal 10.

In the example of FIG. 17, the detachable interface apparatus 900 is attached to the side mirror display 251s.

When it is determined that the detachable interface apparatus 900 is attached to the side mirror display 251s, the processor 270 may determine, based on surrounding situation information, whether there is a preset situation corresponding to the side mirror display 251s.

For example, the preset situation corresponding to the side mirror display 251a is a situation where an object exists in a blind spot on one side of the vehicle 100.

When it is determined that the detachable interface apparatus 900 is attached to the mirror display 251s and that an object exists in a blind spot on one side of the vehicle 100, the processor 270 may determine that there is significant information.

When it is determined that the detachable interface apparatus 900 is attached to the side mirror display 251s and that an object exists in a blind spot on one side of the vehicle 100, the processor 270 may provide a control signal so that an alarm for notifying the presence of the object in the blind spot on one side of the vehicle 100 is output to the mobile terminal 10.

The processor 270 may determine an alarm outputting operation corresponding to significant information, based on a type of the mobile terminal 10. The type of the mobile terminal 10 may be determined based on information acquired from the mobile terminal 10.

The processor 270 may determine a type of the mobile terminal 10 based on information related to the mobile terminal 10. The type of the mobile terminal 10 may be a phone type, a watch type, a glasses type, an earphone type, etc.

There may be different operations for outputting an alarm to be easily recognized by a user depending on the type of the mobile terminal 10.

For example, when it is determined that the mobile terminal 10 is a watch type, the processor 270 may determine vibration or sound as an operation for outputting an alarm for notifying significant information. In this case, when it is determined that there is significant information, the processor 270 may provide a control signal to the mobile terminal 10, so that vibration or sound for notifying the significant information is output to the watch-type mobile terminal 10.

For example, when it is determined that the mobile terminal 10 is a pair of glasses type, the processor 270 may determine an image or sound as an operation of outputting an alarm for notifying significant information. In this case, when it is determined that there is significant information, the processor 270 may provide a control signal to the mobile terminal 10 so that an image or sound for notifying the significant information is output to the glasses-type mobile terminal 10.

When it is determined that the mobile terminal 10 is an earphone type, the processor 270 may determine sound as an operation of outputting an alarm for notifying significant information. In this case, when it is determined that there is significant information, the processor 270 may provide a control signal to the mobile terminal 10 so that sound for notifying significant information is output to the earphone-type mobile terminal 10.

The mobile terminal 10 may output an alarm corresponding to significant information, based on a control signal transmitted by the user interface apparatus 200.

Figure 18:
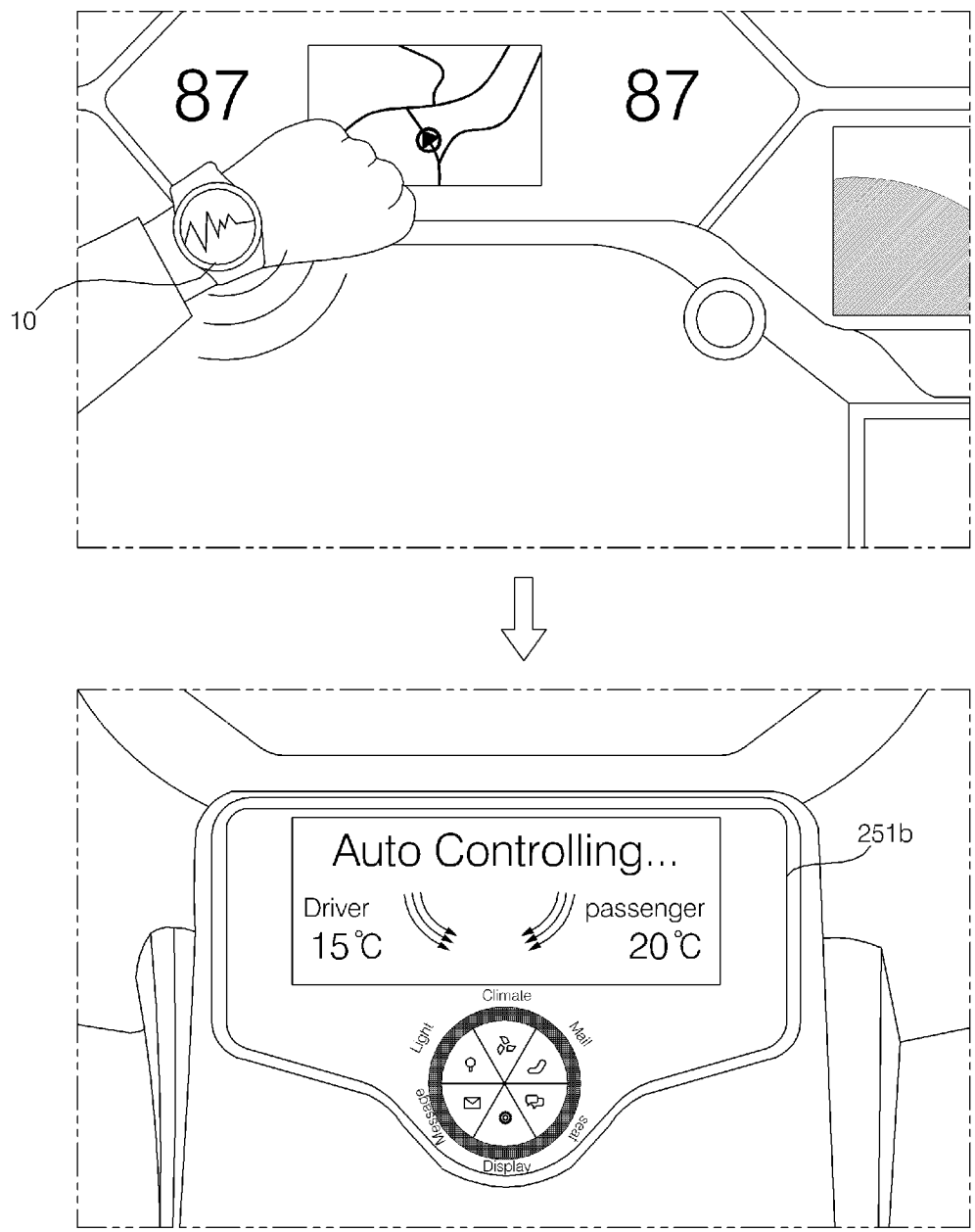
FIG. 18 is a diagram illustrating an example in which a user interface apparatus controls devices inside a vehicle based on information acquired from a mobile terminal.

FIG. 18 is a diagram illustrating an example in which a user interface apparatus controls devices inside a vehicle based on information acquired from a mobile terminal 10.

The processor of the user interface apparatus 200 may control one or more devices provided in the vehicle 100, based on one or more information items acquired from the mobile terminal 10.

The information acquired from the mobile terminal may be at least one of information related to a user of the mobile terminal 10, information related to an application of the mobile terminal, or information related to the mobile terminal 10.

One or more devices provided in the vehicle 100 may be at least one of the vehicle drive apparatus 600, the navigation system 770, or the user interface apparatus 200.

The processor 270 may control one or more devices provided in the vehicle 100 based on user-related information.

For example, when it is determined, based on a user's biometric information or various authentication information, that the user has no right to control the vehicle 100, the processor 270 may deactivate every device provided in the vehicle 100.

For example, the processor 270 may set a destination of the vehicle 100 based on information about the user's schedule.

For example, the processor 270 may control the air conditioner drive unit 660 based on information about the user's temperature.

For example, the processor 270 may output a specific music to the sound output unit 252 or change a driving mode of the vehicle 100 (for example, a comfort mode, a sport mode, a safe driving mode, a high-speed driving mode, etc.), depending on the user's emotional state determined based on the user's biometric information.

For example, when it is determined, based on the user-related information, that the user is not allowed to drive (for example, when the user is determined to be under legal adult age, have no driving license, or be drunk), the processor 270 may perform a control action so that the vehicle 100 enters the autonomous mode.

From among one or more devices provided in the vehicle 100, the processor 270 may control a preset device corresponding to a type of the selected display unit 251.

The interface system according to the present disclosure includes a device which is preset depending on a type of a display unit 251.

For example, the preset device corresponding to the instrument panel 251*a* may include at least one of: the driving manipulation apparatus 500; a device included in the air conditioner drive unit 660 for discharging air toward the driver's seat; the navigation system 770; an output unit 250 disposed in the driver's seat; the input unit 210; the safety apparatus drive unit 640; or the door/window drive unit 630.

For example, a preset device corresponding to the front-passenger seat display 251*e* may include at least one of: a device included in the air conditioner drive unit 660 for discharging air toward the front-passenger seat; the navigation system 700; an output unit 250 disposed in the front-passenger seat; the input unit 210; the safety apparatus drive unit 640; or the door/window drive unit 630.

For example, a preset device corresponding to the RSE 251*d* may include at least one of: a device included in the air conditioner drive unit 660 for discharging air toward a rear seat; the navigation system 770; an output unit 250 disposed in the rear seat; the input unit 210; the safety apparatus drive unit 640; or the door/window drive unit 630.

For example, a preset device corresponding to the CID 251*b* may include every device provided in the vehicle 100.

For example, based on information about the user's temperature acquired from the mobile terminal 10, the processor 270 may control an air conditioner 660 disposed in the user's seat, or a hot wire of the seat. Depending on an occupant's temperature, the processor 270 may adjust temperature of the occupant's seat by controlling a hot wire of the seat or the air conditioner 660 which discharges air toward a seat corresponding to a location of the selected display unit 251.

According to an implementation, the processor 270 may determine a trajectory of the mobile terminal 10 relative to a location of the detachable interface apparatus 900 based on location information of the mobile terminal. The processor 270 may determine the trajectory of the mobile terminal 10, which is determined relative to the location of the detachable interface apparatus 900, as a gesture input.

According to an implementation, the processor 270 may determine a user's occupied seat based on information acquired from the mobile terminal 10. Based on a user input acquired from the mobile terminal 10, the processor 270 may control a device disposed in the user's occupied seat. Accordingly, the user is able to control any device disposed in his/her seat using the mobile terminal 10.

According to an implementation, when it is determined, based on information acquired from the mobile terminal 10, that the mobile terminal 10 is in contact with a display unit 251, the processor 270 may provide a control signal so that a menu for controlling the display unit 251 in contact with the mobile terminal 10 is output to the mobile terminal 10.

According to an implementation, the processor 270 may set a period and time of use in a specific mobile terminal 10. When a user of the mobile terminal 10 gets on the vehicle 100, the processor 270 may perform a control action such that the vehicle 100 does not operate except for the period and time set in the specific mobile terminal 10.

According to an implementation, when the processor 270 is wirelessly connected to a plurality of mobile terminals 10, the processor 270 may assign the plurality of mobile terminals 10 with a different control right dependent upon a user's seat location. In this case, the processor 270 may provide a control signal so that a different remote control menu is output to each of the plurality of mobile terminals 10. A remote control menu output to each of the plurality of mobile terminals 10 may be a menu for controlling a device corresponding to each user's seat location.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface system for a vehicle, comprising:
at least one display unit provided in the vehicle;
a detachable interface apparatus configured to be detachably attached to any one of the at least one display unit provided in the vehicle;
at least one processor; and
a non-transitory computer-readable medium having stored thereon instructions that, when executed by the at least one processor, cause the at least one processor to perform operations comprising:
in a state in which the detachable interface apparatus is attached to a selected display unit among the at least one display unit of the vehicle, determining a first user menu corresponding to the selected display unit; and
displaying, on the selected display unit or on the detachable interface apparatus, the first user menu corresponding to the selected display unit,
wherein the vehicle further comprises a camera,
wherein the vehicle further comprises at least one electromagnet disposed at a rear surface of the at least one display unit and configured to have a variable magnetic force,
wherein the detachable interface apparatus further comprises an electromagnet module disposed at a rear surface of the detachable interface apparatus and configured to have a variable magnetic force, and
wherein the operations executed by the at least one processor further comprise:
in a state in which the detachable interface apparatus is attached to the selected display unit of the vehicle:
determining whether the vehicle is in an autonomous mode or a manual mode, based on vehicle state information acquired through an interface unit of the vehicle,
determining whether a driver of the vehicle or a passenger of the vehicle attempts to detach the detachable interface apparatus, based on an image of an inside of the vehicle acquired through the camera,
based on a determination that the vehicle is in a manual driving mode and that the driver of the vehicle attempts to detach the detachable interface apparatus, increasing an adhesive force by which the detachable interface apparatus is attached to the selected display unit of the vehicle by increasing at least one of a magnetic force of the at least one electromagnet of the at least one display unit, or a magnetic force of the electromagnet module of the detachable interface apparatus, and
based on a determination that the vehicle is in a manual driving mode and that the passenger of the vehicle attempts to detach the detachable interface apparatus, adjusting an adhesive force by which the detachable interface apparatus is attached to the selected display unit of the vehicle to a default degree by adjusting at least one of a magnetic force of the at least one electromagnet of the at least one display unit, or a magnetic force of the electromagnet module of the detachable interface apparatus.

2. The user interface system according to claim 1, wherein the at least one display unit of the vehicle, the at least one processor, and the non-transitory computer-readable medium are implemented as part of a user interface apparatus provided in the vehicle,
wherein the user interface apparatus of the vehicle is configured to be communicative with the detachable interface apparatus.

3. The user interface system according to claim 1,
wherein the operations executed by the at least one processor further comprise:

based on a determination that the selected display unit is an instrument panel of the vehicle, display the first user menu as a driver menu on the selected instrument panel or on the detachable interface apparatus; and based on a determination that the selected display unit is a Center Information Display (CID) or a Rear Seat Entertainment (RSE) of the vehicle, display the first user menu as a passenger menu on the selected CID or on the selected RSE or on the detachable interface apparatus.

4. The user interface system according to claim 1, wherein the vehicle further comprises a communication apparatus, wherein the detachable interface apparatus, which is configured to be detachably attached to the at least one display unit of the vehicle, further comprises:

an input device configured to receive a user input, and comprising at least one of a voice input device, a gesture input device, a touch input device, and a mechanical input device;

a display device configured to output an image; and a communication device configured to communicate with the communication apparatus of the vehicle, and wherein the operations that are executed by the at least one processor further comprise:

acquiring, through the communication apparatus of the vehicle and from the communication device of the detachable interface apparatus, a first user input for controlling the vehicle;

based on the first user input, determining a graphic object to be displayed on the display device of the detachable interface apparatus, wherein the graphic object is configured to allow a user to manipulate the first user menu displayed on the selected display unit or on the detachable interface apparatus; and providing, from the communication apparatus of the vehicle and to the communication device of the detachable interface apparatus, a first control signal configured to cause the display device of the detachable interface apparatus to display the graphic object.

5. The user interface system according to claim 4, wherein the operations executed by the at least one processor further comprise:

in a state in which the detachable interface apparatus is not attached to any of the at least one display unit of the vehicle:

determining a remote control menu for controlling one or more devices included in the vehicle; and providing, from the communication apparatus of the vehicle and to the communication device of the detachable interface apparatus, a second control signal configured to cause the remote control menu to be displayed on the display device of the detachable interface apparatus.

6. The user interface system according to claim 5, wherein the operations executed by the at least one processor further comprise:

in a state in which the detachable interface apparatus is not attached to any of the at least one display unit of the vehicle:

determining whether the vehicle is in an autonomous mode or a manual mode, based on vehicle state information acquired through the interface unit of the vehicle;

based on a determination that the vehicle is in the autonomous mode, outputting the remote control menu to the detachable interface apparatus; and based on a determination that the vehicle is in the manual mode, deactivating the detachable interface apparatus.

7. The user interface system according to claim 6, wherein the operations executed by the at least one processor further comprise:

in the state in which the detachable interface apparatus is not attached to any of the at least one display unit of the vehicle, and based on the determination that the vehicle is in the manual mode:

based on a determination, through an image of an inside of the vehicle acquired through the camera, that a driver of the vehicle is manipulating the detachable interface apparatus, deactivating the detachable interface apparatus; and based on a determination, through the image of the inside of the vehicle acquired through the camera, that a passenger of the vehicle is manipulating the detachable interface apparatus, outputting the remote control menu to the detachable interface apparatus.

8. The user interface system according to claim 1, further comprising a mobile terminal comprising the detachable interface apparatus, wherein the detachable interface apparatus is further configured to be detached from the mobile terminal and wirelessly connected to the mobile terminal, and wherein the operations executed by the at least one processor further comprise:

in the state in which the detachable interface apparatus is attached to the selected display unit of the vehicle, acquire information from the mobile terminal.

9. The user interface system according to claim 8, wherein the operations executed by the at least one processor further comprise:

determining, from the information acquired from the mobile terminal, user information related to a user;

based on the user information, determining the first user menu corresponding to the selected display unit; and displaying the first user menu on the selected display unit.

10. The user interface system according to claim 9, wherein the operations executed by the at least one processor further comprise:

based on a determination that the user information related to the user indicates that the user is a driver of the vehicle, displaying the first user menu as a driver menu on the selected display unit; and based on a determination that the user information related to the user indicates that the user is a passenger of the vehicle, displaying the first user menu as a passenger menu on the selected display unit.

11. The user interface system according to claim 8, wherein the operations executed by the at least one processor further comprise:

controlling one or more devices provided in the vehicle based on the information acquired from the mobile terminal.

12. The user interface system according to claim 11, wherein the operations executed by the at least one processor further comprise:

controlling a first device, among the one or more devices provided in the vehicle, that corresponds to a type of the selected display unit.

13. The user interface system according to claim 8, wherein the operations executed by the at least one processor further comprise:
- determining, from the information acquired from the mobile terminal, application information regarding an application executed by the mobile terminal; and
- based on the application information, outputting, to an output unit of the vehicle, at least one of a screen or a sound of the application executed in the mobile terminal.

14. The user interface system according to claim 13, wherein the operations executed by the at least one processor further comprise:
- reducing the output of the at least one of the screen or the sound of the application based on a determination, through vehicle state information acquired through the interface unit of the vehicle, that the vehicle is in a manual mode.

15. The user interface system according to claim 8, wherein the operations executed by the at least one processor further comprise:
- based on a determination that the information acquired through the interface unit of the vehicle satisfies one or more criteria, providing a first signal to the mobile terminal to output an alarm that corresponds to the information satisfying the one or more criteria, and
- wherein the mobile terminal is configured to output the alarm based on the first signal.

16. The user interface system according to claim 15, wherein the operations executed by the at least one processor further comprise:
- determining whether the information acquired through the interface unit of the vehicle satisfies the one or more criteria, based on a type of the selected display unit; and
- determining an alarm output operation for outputting the alarm, based on a type of the mobile terminal that will output the alarm, the type of the mobile terminal being determined based on the information acquired through the interface unit.

17. The user interface system according to claim 1, further comprising a mobile terminal, and
- wherein the vehicle and the mobile terminal are configured to be wirelessly connected to each other in a state in which the detachable interface apparatus is wirelessly connected to the mobile terminal.

18. The user interface system according to claim 17, wherein the operations executed by the at least one processor further comprise:
- in a state in which the vehicle and the mobile terminal are wirelessly connected to each other, providing a control signal to the mobile terminal for outputting a remote control menu, wherein the remote control menu is configured to allow a user to control one or more devices provided in the vehicle.

19. The user interface system according to claim 18, wherein the mobile terminal is one among a plurality of mobile terminals,
- wherein the detachable interface apparatus is configured to be wirelessly connected to a first mobile terminal, among the plurality of mobile terminals that are located within a first distance of the vehicle, and
- wherein the operations executed by the at least one processor further comprise:
  - in a state in which the vehicle is wirelessly connected to the plurality of mobile terminals, receiving a plurality of user inputs respectively from the plurality of mobile terminals; and
  - determining that a first user input received from the first mobile terminal that ii connected to the detachable interface apparatus is a first-prioritized input among the plurality of user inputs.

* * * * *